United States Patent
Hu et al.

(10) Patent No.: US 12,376,156 B2
(45) Date of Patent: Jul. 29, 2025

(54) METHODS AND APPARATUSES FOR A RANDOM ACCESS CHANNEL (RACH) STRUCTURE

(71) Applicant: ZTE CORPORATION, Guangdong (CN)

(72) Inventors: Yuzhou Hu, Shenzhen (CN); Li Tian, Shenzhen (CN); Ziyang Li, Shenzhen (CN); Weimin Li, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 250 days.

(21) Appl. No.: 17/512,428

(22) Filed: Oct. 27, 2021

(65) Prior Publication Data
US 2022/0231806 A1    Jul. 21, 2022

Related U.S. Application Data

(63) Continuation of application No. PCT/CN2019/085404, filed on May 2, 2019.

(51) Int. Cl.
*H04L 5/00* (2006.01)

(52) U.S. Cl.
CPC .......... *H04L 5/0048* (2013.01); *H04L 5/0044* (2013.01)

(58) Field of Classification Search
CPC ... H04L 5/0048; H04L 5/0044; H04L 5/0051; H04L 5/0053; H04J 11/0073; H04J 11/0076; H04J 13/16; H04B 7/0695; H04W 74/0833; H04W 72/044; H04W 74/004; H04W 72/23

See application file for complete search history.

(56) References Cited

U.S. PATENT DOCUMENTS

2015/0189627 A1    7/2015  Yang et al.
2020/0314913 A1*  10/2020  Rastegardoost .. H04W 36/0064

FOREIGN PATENT DOCUMENTS

| CN | 106716930 A | 5/2017 |
|---|---|---|
| CN | 110999448 A | 4/2020 |
| WO | WO-2019/014907 A1 | 1/2019 |

OTHER PUBLICATIONS

International Search Report and Written Opinion of the International Searching Authority for PCT/CN2019/085404 dated Jan. 23, 2020 (10 pages).
VIVO: "Discussion on channel structure for 2-step RACH" 3GPP TSG RAN WG1 #96bis; R1-1904059; Apr. 12, 2019; Xi'an, China (10 pages).

(Continued)

*Primary Examiner* — Derrick W Ferris
*Assistant Examiner* — Jesse P. Samluk
(74) *Attorney, Agent, or Firm* — Foley & Lardner LLP

(57) ABSTRACT

Systems and methods for determining a mapping that associates a plurality of preambles to a plurality of channel resource units used to carry a plurality of payloads associated with the plurality of preambles, including but not limited to, determining that the plurality of channel resource units is carrying the plurality of payloads, determining that a set of preambles of the plurality of preambles is associated with a same beam, and prioritizing mapping the set of preambles to reference signals of the plurality of channel resource units corresponding to different code division multiplexing (CDM) groups.

15 Claims, 19 Drawing Sheets

(56) References Cited

OTHER PUBLICATIONS

VIVO: "Discussion on channel structure for 2-step RACH" 3GPP TSG RAN WG1 #97; R1-1906124; May 17, 2019; Reno, USA (14 pages).
First Office Action for CN Appl. No. 2022107237722, dated Dec. 7, 2022 (with English Translation, 13 pages).
First Office Action for Japanese Appl. No. 2021-564756, dated May 11, 2023 (5 pages, including English translation).
Samsung, "Channel Structure for Two-Step RACH", 3GPP TSG RAN WG1 #96bis, 3GPP, R1-1904392, Xi'an, China, Apr. 12, 2019 (8 pages).
Extended European Search Report for EP Appl. No. 19927082.8, dated Oct. 17, 2022 (9 pages).
OPPO, "On Channel Structure for 2-step RACH" 3GPP TSG RAN WG1 #96bis, R1-1905051, Apr. 12, 2019, Xi'an, China (12 pages).
First Office Action for Korean Appln. No. 10-2021-7038880, dated Oct. 21, 2024 (7 pages, including English translation).
ZTE, "Updated summary of 7.2.1.1 Channel Structure for Two-step RACH", 3GPP TSG RAN WG1 #96bis, R1-1905793, Apr. 15, 2019, Xi'an, China (36 pages).

\* cited by examiner

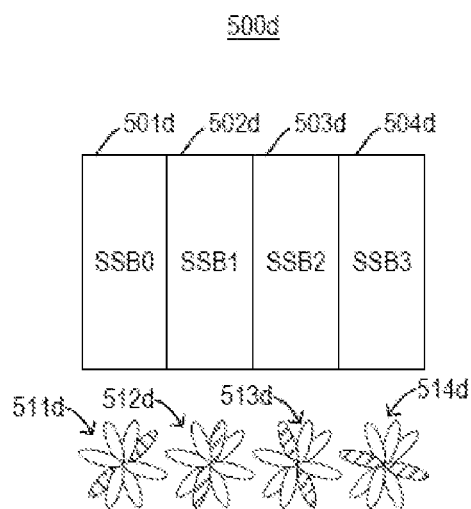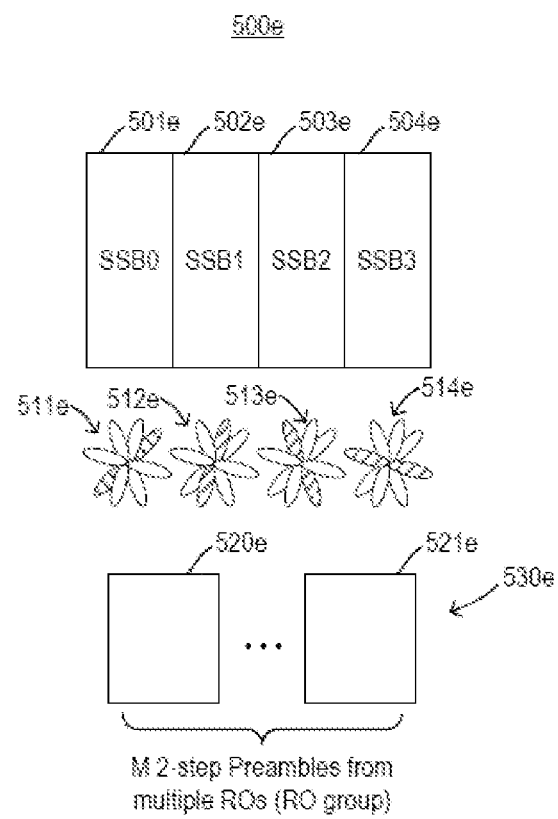
FIG. 5D
FIG. 5E

METHODS AND APPARATUSES FOR A RANDOM ACCESS CHANNEL (RACH) STRUCTURE

CROSS-REFERENCE TO RELATED APPLICATION

This application claims the benefit of priority under 35 U.S.C. § 120 as a continuation of PCT Patent Application No. PCT/CN2019/085404, filed on May 2, 2019, the disclosure of which is incorporated herein by reference in its entirety.

TECHNICAL FIELD

The disclosure relates generally to wireless communications and, more particularly, to methods and apparatuses for a random access channel (RACH) structure.

BACKGROUND

In the $3^{rd}$ Generation Partnership Project (3GPP) standard (e.g., both the 4th Generation (4G) and the 5th Generation (5G) new radio (NR) mobile networks), before a wireless communication device (e.g., a user equipment (UE)) can send data to a base station (BS), the wireless communication device needs to perform uplink synchronization and downlink synchronization with the BS. The uplink timing synchronization can be achieved by performing a random access procedure via a suitable RACH structure.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a method includes determining a mapping that associates a plurality of preambles to a plurality of channel resource units used to carry a plurality of payloads associated with the plurality of preambles by: determining that the plurality of channel resource units is carrying the plurality of payloads, determining that a set of preambles of the plurality of preambles is associated with a same beam, and prioritizing mapping the set of preambles to reference signals of the plurality of channel resource units corresponding to different code division multiplexing (CDM) groups.

In some embodiments, an apparatus including at least one processor and a memory, the at least one processor is configured to read code from the memory and implement a method that includes determining a mapping that associates a plurality of preambles to a plurality of channel resource units used to carry a plurality of payloads associated with the plurality of preambles by: determining that the plurality of channel resource units is carrying the plurality of payloads, determining that a set of preambles of the plurality of preambles is associated with a same beam, and prioritizing mapping the set of preambles to reference signals of the plurality of channel resource units corresponding to different CDM groups.

In some embodiments, a computer program product comprising a computer-readable program medium code stored thereupon, the code, when executed by at least one processor, causing the at least one processor to implement a method that includes determining a mapping that associates a plurality of preambles to a plurality of channel resource units used to carry a plurality of payloads associated with the plurality of preambles by: determining that the plurality of channel resource units is carrying the plurality of payloads, determining that a set of preambles of the plurality of preambles is associated with a same beam, and prioritizing mapping the set of preambles to reference signals of the plurality of channel resource units corresponding to different CDM groups.

In some embodiments, a method includes receiving, by a base station from a wireless communication device, data comprising a preamble of a plurality of preambles, a payload of a plurality of payloads, and a mapping that associates the plurality of preambles to a plurality of channel resource units used to carry the plurality of payloads associated with the plurality of preambles, and identifying a channel resource unit of the plurality of channel resource units based on the mapping. The channel resource unit is used to carry payload. A set of preambles of the plurality of preambles is associated with a same beam. The set of preambles is prioritized to be mapped to reference signals of the plurality of channel resource units corresponding to different CDM groups.

In some embodiments, an apparatus including at least one processor and a memory, the at least one processor is configured to read code from the memory and implement a method that includes receiving, by a base station from a wireless communication device, data comprising a preamble of a plurality of preambles, a payload of a plurality of payloads, and a mapping that associates the plurality of preambles to a plurality of channel resource units used to carry the plurality of payloads associated with the plurality of preambles, and identifying a channel resource unit of the plurality of channel resource units based on the mapping. The channel resource unit is used to carry payload. A set of preambles of the plurality of preambles is associated with a same beam. The set of preambles is prioritized to be mapped to reference signals of the plurality of channel resource units corresponding to different CDM groups.

In some embodiments, a computer program product comprising a computer-readable program medium code stored thereupon, the code, when executed by at least one processor, causing the at least one processor to implement a method that includes receiving, by a base station from a wireless communication device, data comprising a preamble of a plurality of preambles, a payload of a plurality of payloads, and a mapping that associates the plurality of preambles to a plurality of channel resource units used to carry the plurality of payloads associated with the plurality of preambles, and identifying a channel resource unit of the plurality of channel resource units based on the mapping. The channel resource unit is used to carry payload. A set of preambles of the plurality of preambles is associated with a same beam. The set of preambles is prioritized to be mapped to reference signals of the plurality of channel resource units corresponding to different CDM groups.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5CB illustrates an unevenly divided scenario of an example mapping scheme, in accordance with some embodiments of the present disclosure.

FIG. 5D is a diagram 500d illustrating the correspondence between an RO and beams, in accordance with some embodiments of the present disclosure.

FIG. 5E is a diagram illustrating the correspondence between multiple ROs (RO group) and beams, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In the 3GPP standard, a RACH procedure is used to obtain uplink timing synchronization between a wireless communication device (e.g., a UE) and a BS. The random access procedure can involve a 4-step RACH or a 2-step RACH.

Figure 1A:
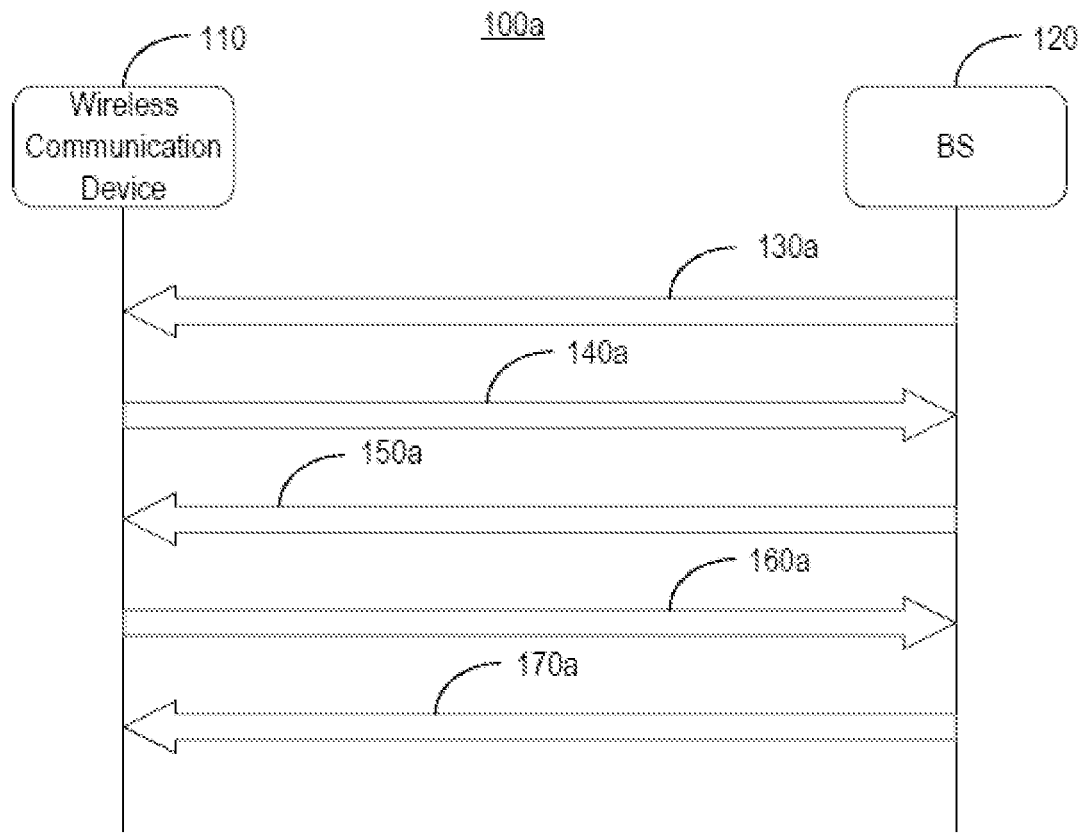
FIG. 1A is a signaling diagram illustrating an example 4-step RACH procedure, in accordance with an embodiment of the present disclosure.

FIG. 1A is a signaling diagram illustrating an example 4-step RACH procedure 100a, in accordance with an embodiment of the present disclosure. In the 4-step RACH procedure 100a, a BS 120 performs downlink synchronization for a wireless communication device 110, at 130a. The wireless communication device 110 transmits a RACH preamble in Message 1 ("msg1") to the BS 120, at 140a. Responsive to the RACH preamble being received by the BS 120, the BS 120 sends Message 2 ("msg2") back to the wireless communication device 110, at 150a. The msg2 includes at least a medium access control (MAC) random access response (RAR) as a response to the RACH preamble. Responsive to the MAC RAR with corresponding random access preamble (RAP) identifier (ID) being received by the wireless communication device 110, the wireless communication device 110 transmits Message 3 ("msg3") to the BS 120, at 160a. The msg3 includes at least the grant carried in the MAC RAR, an identifier of the wireless communication device 110 (e.g., a UE ID), control information, and so on. Responsive to the BS 120 receiving the msg3, the BS 120 sends Message 4 ("msg4") back to the wireless communication device 110, at 170*a*. The msg4 includes at least a radio resource control (RRC) established message, contention resolution ID for the purpose of contention resolution, and so on.

Figure 1B:
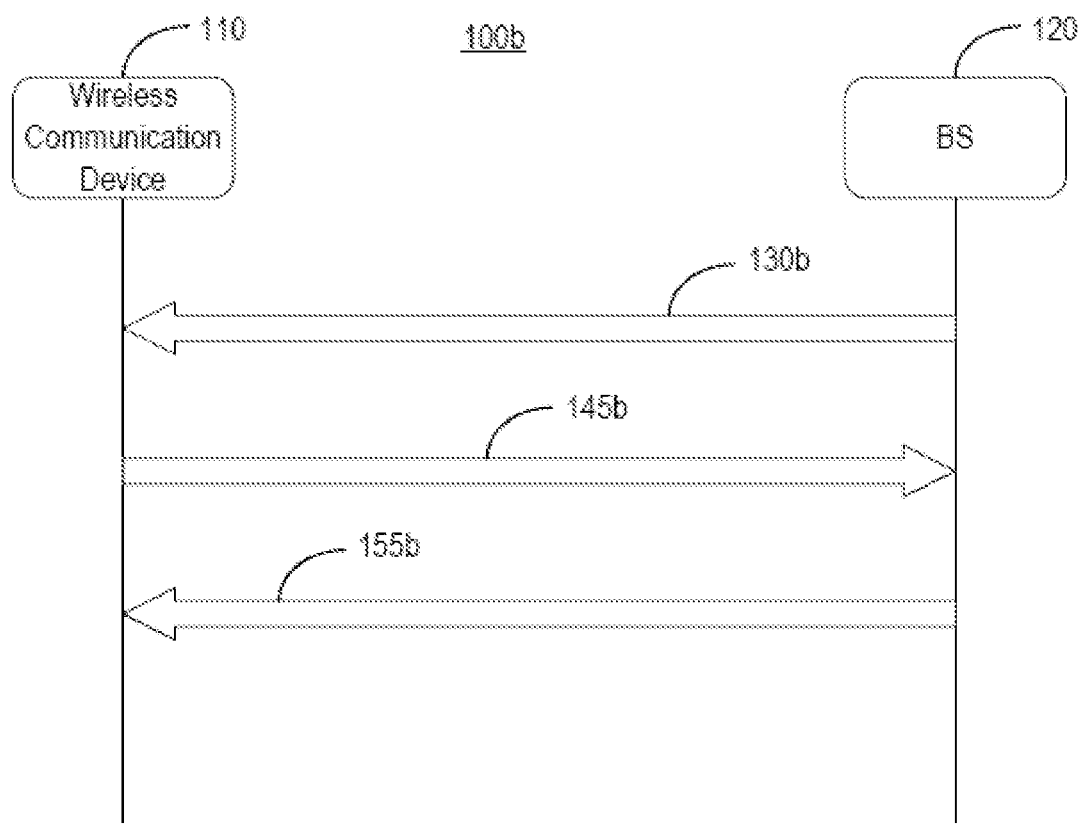
FIG. 1B is a signaling diagram illustrating an example 2-step RACH procedure, in accordance with an embodiment of the present disclosure.

The 2-step RACH can be regarded as a simplified RACH process. FIG. 1B is a signaling diagram illustrating an example 2-step RACH procedure 100*b*, in accordance with an embodiment of the present disclosure. In the 2-step RACH procedure 100*b*, the BS 120 performs downlink synchronization for the wireless communication device 110, at 130*b*. The wireless communication device 110 transmits Message A ("msgA") to the BS 120, at 145*b*. The msgA includes at least the msg1 and the msg3 of the 4-step RACH procedure 100*a*. The msg1 includes at least the preamble, which is carried on the physical RACH (PRACH). The msg3 (e.g., including one or more of the grant, the identifier of the wireless communication device 110, control information, and so on) can be regarded as a payload that is carried on physical uplink shared channel (PUSCH). Responsive to the RACH preamble being received by the BS 120, the BS 120 sends Message B ("msgB") back to the wireless communication device 110, at 155*b*. The msgB includes at least the msg2 (e.g., MAC RAR) and/or the msg4 (e.g., the RRC established message, the contention resolution ID, and so on) of the 4-step RACH procedure 100*a*. As such, instead of two interactions (each interaction includes transmission of two messages or steps) as called for by the 4-step RACH procedure 100*a*, the 2-step RACH procedure 100*b* needs one interaction between the BS 120 and the wireless communication device 110 to establish RRC connection. Accordingly, comparing to the 4-step RACH procedure 100*a*, the 2-step RACH procedure 100*b* simplifies the RACH procedure, saves signaling overhead, reduces power consumption, and so on.

Each PUSCH resource unit corresponds to resources used to carry a payload. Each PUSCH resource unit can be defined based on time, frequency, and demodulation reference signal (DMRS). In some examples, a PUSCH resource unit encompasses a DMRS port and/or a DMRS sequence. The DMRS can be embedded in the payload transmission.

In the 2-step RACH procedure 100*b*, the msgA includes a mapping between the preamble (carried on the PRACH) and the PUSCH resource unit (used to carry the payload such as but not limited to, the msg3). The BS 120 can use the mapping included in the msgA to identify the PUSCH resource unit mapped to the preamble, in response to successfully receiving and decoding the preamble.

Principles and detailed mapping formula are disclosed for mapping M preambles to PUSCH resource units associated with the M preambles. The specification further provides association methods of M preambles and the PUSCH resource units as part of the mapping. The specification specifies mapping relationship/association method by formula explicitly or by descriptions of certain principle.

For each RACH occasion (RO), a certain number of preambles dedicated for the 2-step RACH procedure 100*b* are specified. The RO refers to the location of preamble transmission resource in time and frequency domains. The certain number of preambles are identified using preamble index numbers arranged in increasing order. For example, M preambles (from one or more ROs) can be arranged or ordered according an index-first, frequency-second, and time-third principle. The PUSCH resource units can also be arranged or ordered according to suitable criteria. Then, the mapping between the M preambles and the PUSCH resource units corresponds to associating/mapping the ordered preambles with/to the ordered PUSCH resource units. Depending on a mapping ratio (e.g., a ratio between M and a number of PUSCH resource units), the association/mapping between the preambles in each RO and associated PUSCH resource unit(s) can be one-to-one or multiple-to-one.

To avoid the timing offset impact on the orthogonal cover code (OCC) pattern and demodulation reference signal (DMRS) sequence division among different wireless communication devices during the RACH procedures, the PUSCH resource units associated with the same beam are assigned to different code division multiplexing (CDM) groups. For the 2-step RACH procedure 100*b*, the preambles associated with the same beam are ordered consecutively, in increasing indexes. Following the aforementioned ordering principle, the PUSCH resource units associated with the same beam are more likely to be OCC pattern/DMRS sequence divided because a number of the CDM groups is smaller than a number of OCC patterns/DMRS sequences. Systems and methods are described herein for addressing such deficiencies in conventional systems.

Figure 1C:
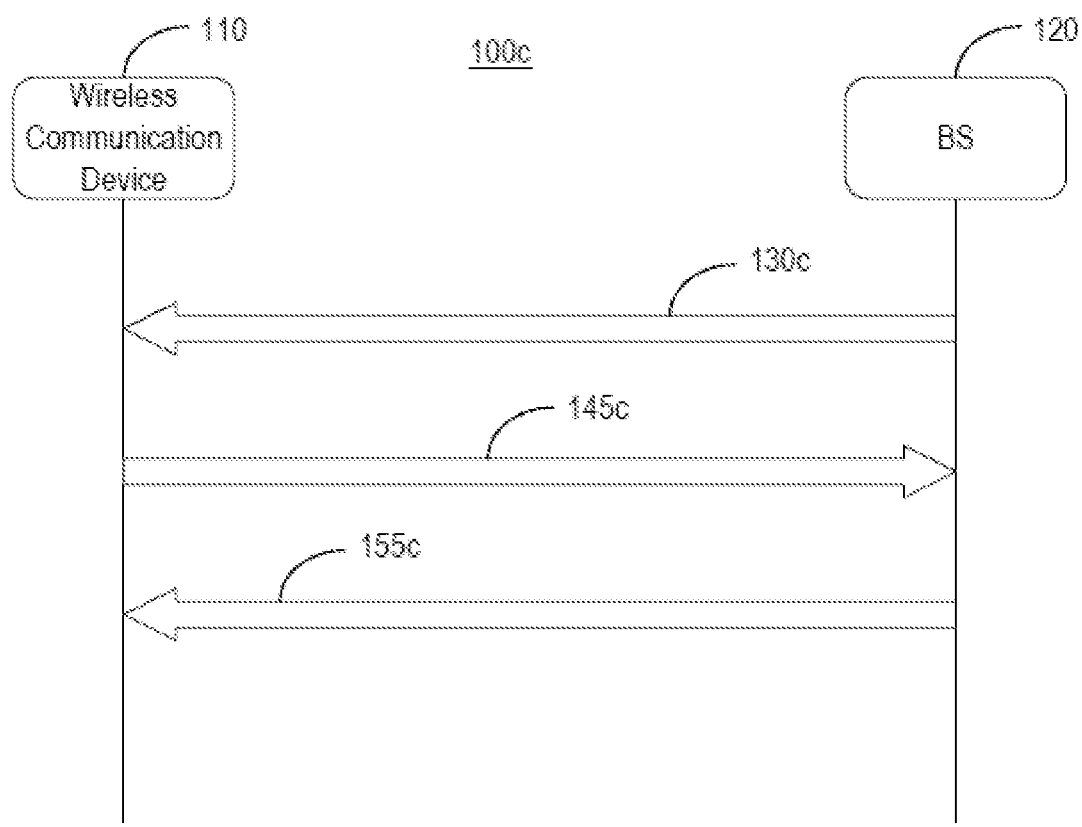
FIG. 1C is a signaling diagram illustrating an example uplink grant-free uplink data transmission procedure, in accordance with an embodiment of the present disclosure.

In some examples, the channel structure of "preamble+ payload" can be also implemented for uplink grant-free uplink data transmission. FIG. 1C is a signaling diagram illustrating an example uplink grant-free uplink data transmission procedure 100*c*, in accordance with an embodiment of the present disclosure. In the uplink grant-free uplink data transmission procedure 100*c*, the BS 120 performs downlink synchronization for the wireless communication device 110, at 130*c*. The wireless communication device 110 sends a message to the BS 120 in uplink, at 145*c*. The message includes a preamble and a payload. The BS 120 sends a response at 155*c* back to the wireless communication device 155*c* in downlink, where the response includes an acknowledgement (ACK) or negative-acknowledgement (NACK). The payload of msgA of the 2-step RACH procedure 100*b* carries only control plane (CP) data. On the other hand, the content of the payload (e.g., of the message sent at 145*c*) for the grant-free uplink data transmission procedure 100*c* can include some user plane (UP) data. In the uplink grant-free uplink data transmission procedure 100*c*, an RRC connection does not need to be established if the UP data is successfully decoded. Responsive to the preamble of the message of 145*c* being detected, the BS 120 is to identify the PUSCH resource unit carrying the payload of the message of 145*c*. Therefore, also with respect to the uplink grant-free uplink data transmission procedure 100*c*, a mapping between the preamble(s) and PUSCH resource unit(s) is needed. Accordingly, mapping scheme described herein can be likewise implemented for the message (which uses the "preamble+payload" configuration) communicated at 145*c*.

Figure 2:
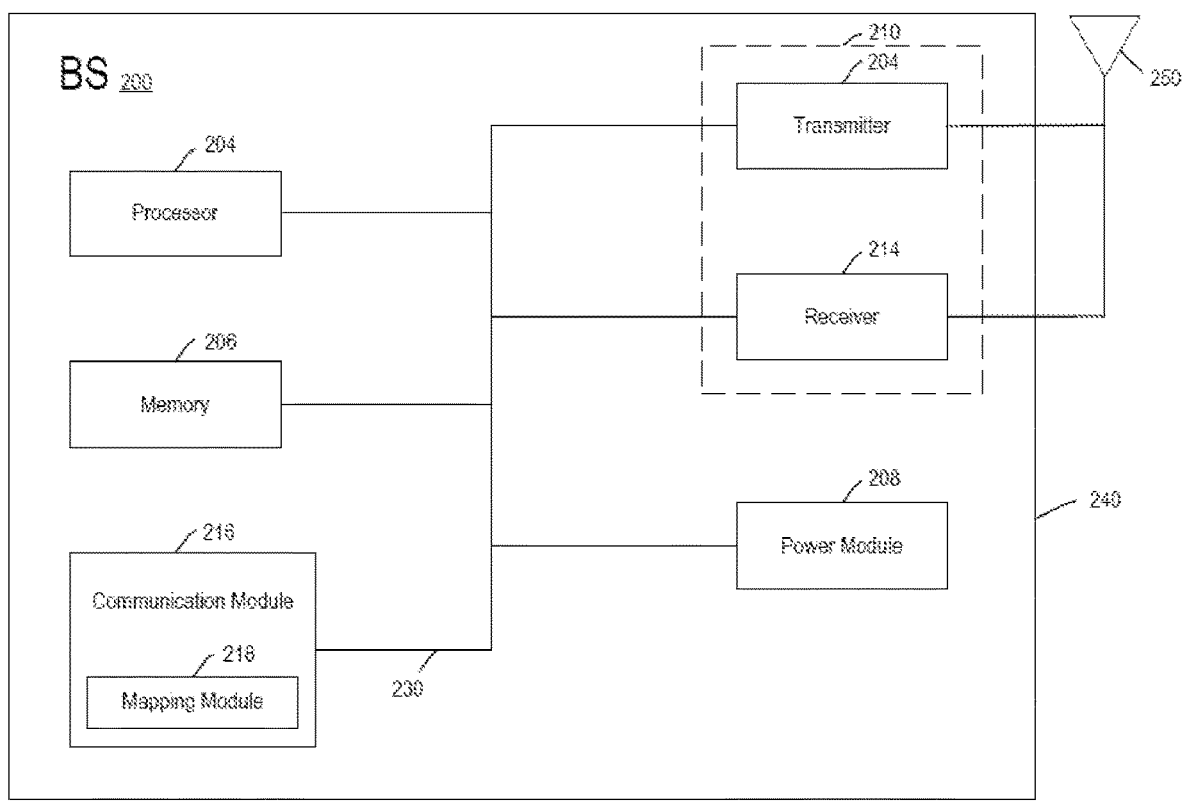
FIG. 2 illustrates a block diagram of a base station (BS), in accordance with some embodiments of the present disclosure.

FIG. 2 illustrates a block diagram of a BS 200, in accordance with some embodiments of the present disclosure. Referring to FIGS. 1A-2, the BS 200 is an example implementation of the BS 120. In some examples, the BS 200 is an example of a node that can be configured to implement the various methods described herein. As shown in FIG. 2, the BS 200 includes a housing 240 containing a processor 204, a memory 206, a transceiver 210 including a transmitter 212 and a receiver 214, a power module 208, a communication module 216 including a mapping module 218, and so on.

The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (e.g., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., another BS or a wireless communication device). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

Figure 3:
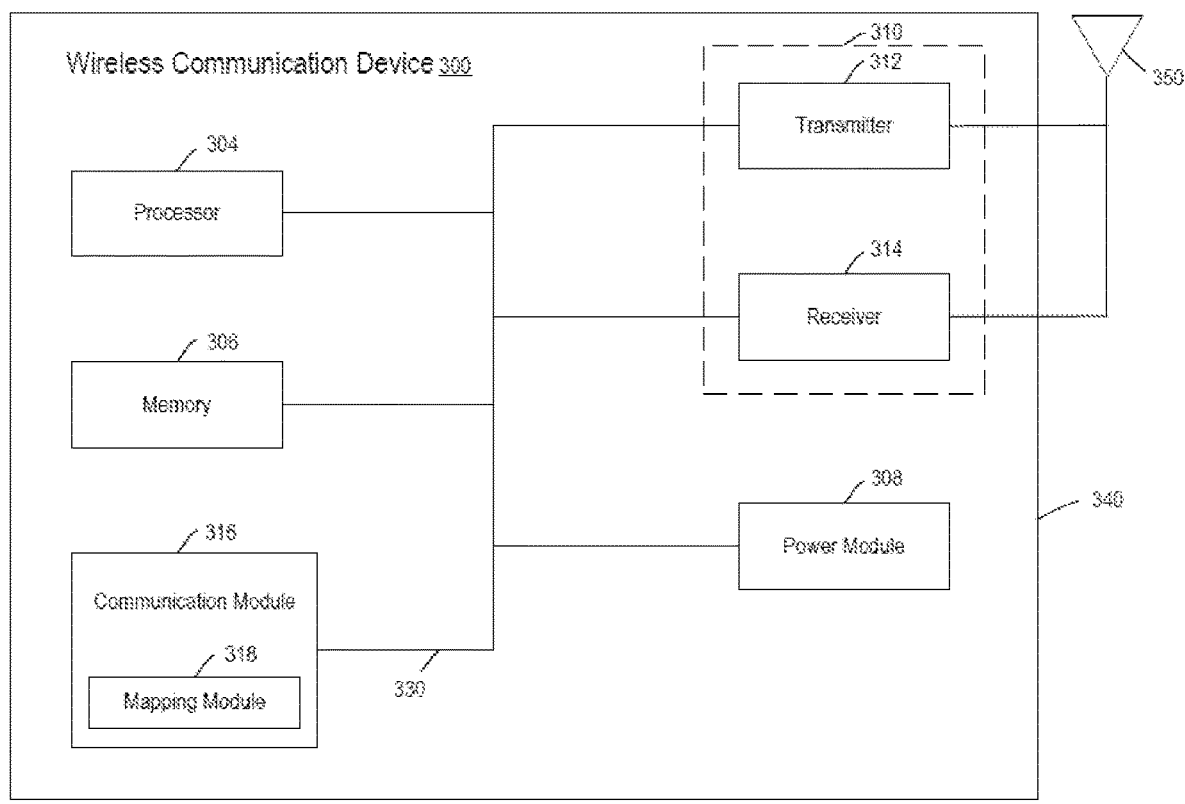
FIG. 3 illustrates a block diagram of a wireless communication device, in accordance with some embodiments of the present disclosure.

The communication module 216 can be implemented with the processor 204 and the memory 206 and is configured to perform communications between the BS 200 and a wireless communication device (e.g., the wireless communication device 110 of FIGS. 1A-1C and the wireless communication device 300 of FIG. 3). For example, the communication module 216 is configured to perform BS-side operations in connection with at least the 4-step RACH procedure 100a, the 2-step RACH procedure 100b, and the uplink grant-free uplink data transmission procedure 100c as described herein.

In a communication system including the BS 200 that can serve one or more wireless communication devices, the BS 200 may receive a random access request or message (e.g., in the processes 100a or 100b) from a wireless communication device for access to the BS 200. The BS 200 may also receive grant-free uplink data transmission from a wireless communication device (e.g., in the process 100c).

In one embodiment, the communication module 216 may generate messages responsive to the data transmission received from the wireless communication device and transmit the message via the transmitter 212 to the wireless communication device.

In connection with the 2-step RACH procedure 100b and the uplink grant-free uplink data transmission procedure 100c in which the "preamble+payload" configuration is used, the communication module 216 may receive, via the receiver 214 from the wireless communication device, data transmission including a preamble and a payload. The mapping module 218 is used to determine/identify locations of PUSCH resource units carrying the payload based on information (e.g., mapping information) in the preamble.

The power module 208 can include a power source such as one or more batteries, and a power regulator, to provide regulated power to each of the above-described modules of the BS 200. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. Conversely, each of the modules illustrated in FIG. 2 can be implemented using a plurality of separate components or elements.

FIG. 3 illustrates a block diagram of a wireless communication device 300, in accordance with some embodiments of the present disclosure. Referring to FIGS. 1A-3, the wireless communication device 300 is an example implementation of the wireless communication device 110. The wireless communication device 300 is an example of a device that can be configured to implement the various methods described herein. As shown in FIG. 3, the wireless communication device 300 includes a housing 340 containing a processor 304, a memory 306, a transceiver 310 including a transmitter 312 and a receiver 314, a power module 308, a communication module 316 including a mapping module 318, and so on.

The processor 304 controls the general operation of the wireless communication device 300 and can include one or more processing circuits or modules such as a CPU and/or any combination of general-purpose microprocessors, microcontrollers, DSPs, FPGAs, PLDs, controllers, state machines, gated logic, discrete hardware components, dedicated hardware finite state machines, or any other suitable circuits, devices and/or structures that can perform calculations or other manipulations of data.

The memory 306, which can include both ROM and RAM, can provide instructions and data to the processor 304. A portion of the memory 306 can also include NVRAM. The processor 304 typically performs logical and arithmetic operations based on program instructions stored within the memory 306. The instructions (e.g., software) stored in the memory 306 can be executed by the processor 304 to perform the methods described herein. The processor 304 and memory 306 together form a processing system that stores and executes software.

The transceiver 310, which includes the transmitter 312 and receiver 314, allows the wireless communication device 300 to transmit and receive data to and from a remote device (e.g., a BS). An antenna 350 or a multi-antenna array is attached to the housing 340 and electrically coupled to the transceiver 310. In various embodiments, the wireless communication device 300 includes (not shown) multiple transmitters, multiple receivers, and multiple transceivers. In one embodiment, the antenna 350 is replaced with a multi-antenna array that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

The communication module 316 can be implemented with the processor 304 and the memory 306 and is configured to perform communications between the wireless communication device 300 and a BS (e.g., the BSs 120 and 200). For example, the communication module 316 is configured to perform UE-side operations in connection with at least the 4-step RACH procedure 100a, the 2-step RACH procedure 100b, and the uplink grant-free uplink data transmission procedure 100c as described herein.

In a communication system, the wireless communication device 300 may attempt to access a BS for data transfer. In one embodiment, the communication module 316 can generate a message including a preamble and a payload (e.g., in the 2-step RACH procedure 100b and the uplink grant-free uplink data transmission procedure 100c).

The communication module 316 can transmit messages (e.g., those in the 2-step RACH procedure 100b and the uplink grant-free uplink data transmission procedure 100c) via the transmitter 312 to the BS. The communication module 316 can receive, via the receiver 314 from the BS, a message in response to any message sent by the wireless communication device 300.

In connection with the 2-step RACH procedure 100b and the uplink grant-free uplink data transmission procedure 100c in which the "preamble+payload" configuration is used, the communication module 316 may send, via the transmitter 312 to the BS, data transmission including a preamble and a payload. The mapping module 318 maps the PUSCH resource units carrying the payload to the preamble in the manner described.

The power module 308 can include a power source such as one or more batteries, and a power regulator, to provide regulated power to each of the above-described modules of the wireless communication device 300. In some embodiments, if the wireless communication device 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the wireless communication device 300 can be operatively coupled to one another using any suitable techniques and mediums.

Although a number of separate modules or components are illustrated in FIG. 3, persons of ordinary skill in the art will understand that one or more of the modules can be combined or commonly implemented. Conversely, each of the modules illustrated in FIG. 3 can be implemented using a plurality of separate components or elements.

Figure 4:
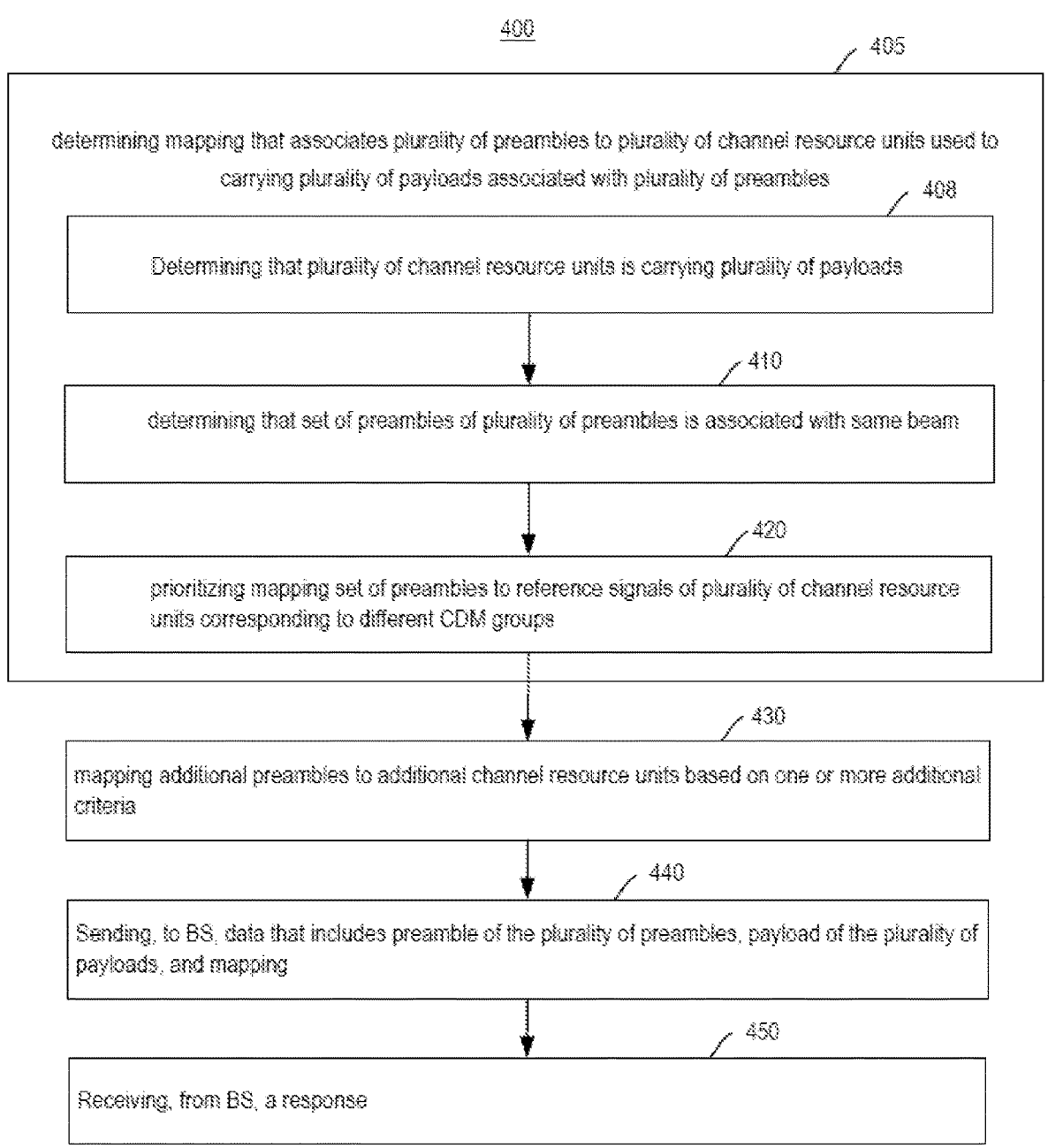
FIG. 4 illustrates a flow chart for a method for managing data transmission (including a preamble and a payload) between a wireless communication device and a BS, in accordance with some embodiments of the present disclosure.

FIG. 4 illustrates a flow chart for a method 400 for managing data transmission (including a preamble and a payload) between the wireless communication device 300 and the BS 200, in accordance with some embodiments of the present disclosure. Referring to FIGS. 1B-4, the method 400 is performed by the wireless communication device 300. The method 400 involves prioritizing the preambles associated with the same Synchronization Signal Block (SSB) or beam to be associated with DMRS from different CDM groups. The remaining preambles and the remaining PUSCH resource units can be associated based on an increasing order of index, frequency, and time.

At 405, the wireless communication device 300 (e.g., the mapping module 318) determines a mapping that associates a plurality of preambles to a plurality of channel resource units used to carry a plurality of payloads associated with the plurality of preambles. Examples of the channel resource units include but are not limited to, the PUSCH resource units.

In some examples, the mapping module 318 can determine information about the channel resource units based on configured values in system information block 2 (SIB2) or RRC messages. The SIB2 and the RRC messages may be broadcasted or otherwise sent by the BS 200. The wireless communication device 200 receives the SIB2 and the RRC messages from the BS 200.

Examples of the configured values include but are not limited to, one or more of a number of frequency domain multiplexing PUSCH occasions (Nfdm), number of time domain multiplexing PUSCH occasions (Ntdm), a number of physical uplink shared channel (PUSCH) occasions (POs) Ni of a given time resources and frequency resources, a number of n demodulation reference signal (nDMRS) resources, a preamble to PUSCH resource unit mapping ratio X, offsets to associated RO, offsets configured for the POs following new radio (NR) configured grant principle, time frequency resource size of the POs, or synchronization signal block (SSB) associated with the PUSCH resource unit. As described, Ni stands for a number of POs of a given resource size.

The information about the set of channel resource units comprise at least one of a number of demodulation reference signal (DMRS) ports, a number of DMRS sequences, or a number of physical uplink shared channel (PUSCH) occasions (POs) within the set of channel resource units.

Block 405 includes at least blocks 408, 410, and 420. At 408, the mapping module 318 determines that the plurality of channel resource units is carrying the plurality of payloads. At 410, the mapping module 318 determines that a set of preambles (including one or more preambles) of the plurality of preambles is associated with a same beam. Beams are defined based on the SSB. Therefore, determining that the set of preambles of the plurality of preambles is associated with a same beam includes determining that the set of preambles of the plurality of preambles is associated with a same SSB.

At 420, the mapping module 318 prioritizes mapping the set of preambles (associated with the same beam) to reference signals of the plurality of channel resource units corresponding to different CDM groups. Examples of the reference signals include but are not limited to, the DMRS. In some examples, prioritizing mapping the set of preambles to the reference signals of the plurality of channel resource units corresponding to the different CDM groups includes determining the reference signals corresponding to the different CDM groups based on a number of beams. In some examples, prioritizing mapping the set of preambles to the reference signals of the plurality of channel resource units corresponding to the different CDM groups includes converting first preamble indexes that identify the plurality of preambles into second preamble indexes that identify the plurality of preambles based on a number of beams, determining a CDM group indexes, and mapping the set of preambles to the reference signals of the plurality of channel resource units corresponding to the different CDM groups based on the second preamble indexes and the CDM group indexes. The mapping is described in further detail with respect to FIGS. 5A-5C.

In some examples, prioritizing mapping the set of preambles to the reference signals of the plurality of channel resource units corresponding to the different CDM groups is referring to performing the mapping based the different CDM groups before performing the mapping based on one or more additional criteria. In some examples, the one or more additional criteria include, for example, indexes, frequencies, and time. After the priority mapping based on the CDM groups, additional preambles and channel resource units can be mapped according to the additional criteria. Thus, the method 400 further includes mapping additional preambles to additional channel resource units based on one or more of indexes, frequencies, and time, at 430. 430 is performed after determining the additional preambles of the plurality of preambles other than the mapped set of preambles, and after determining the additional channel resource units of the plurality of channel resource units other than mapped channel resource units.

At 440, the communication module 318 configures the transmitter 312 to send to the BS 200, data that includes a preamble of the plurality of preambles, a payload of the plurality of payloads, and the mapping.

In some examples, the data corresponds to msgA of the 2-step RACH procedure 100b. The msgA is sent by the wireless communication device 300 to the BS 200. The preamble corresponds to a RACH preamble. The payload includes CP data. In some examples, the payload includes a grant, an identifier of the wireless communication device 300, and control information.

In some examples, the data corresponds to a message of the uplink grant-free uplink data transmission procedure 100c. The message is sent by the wireless communication device 300 to the BS 200. The payload includes UP data.

At 450, the communication module 318 configures the receiver 314 to receive from the BS 200, a response.

Various example mapping schemes are presented as non-limiting approaches for performing the mapping, for example, at block 405. The example mapping schemes are described in detail with reference to FIGS. 5A-5F and tables 1 and 2.

Figure 5A:
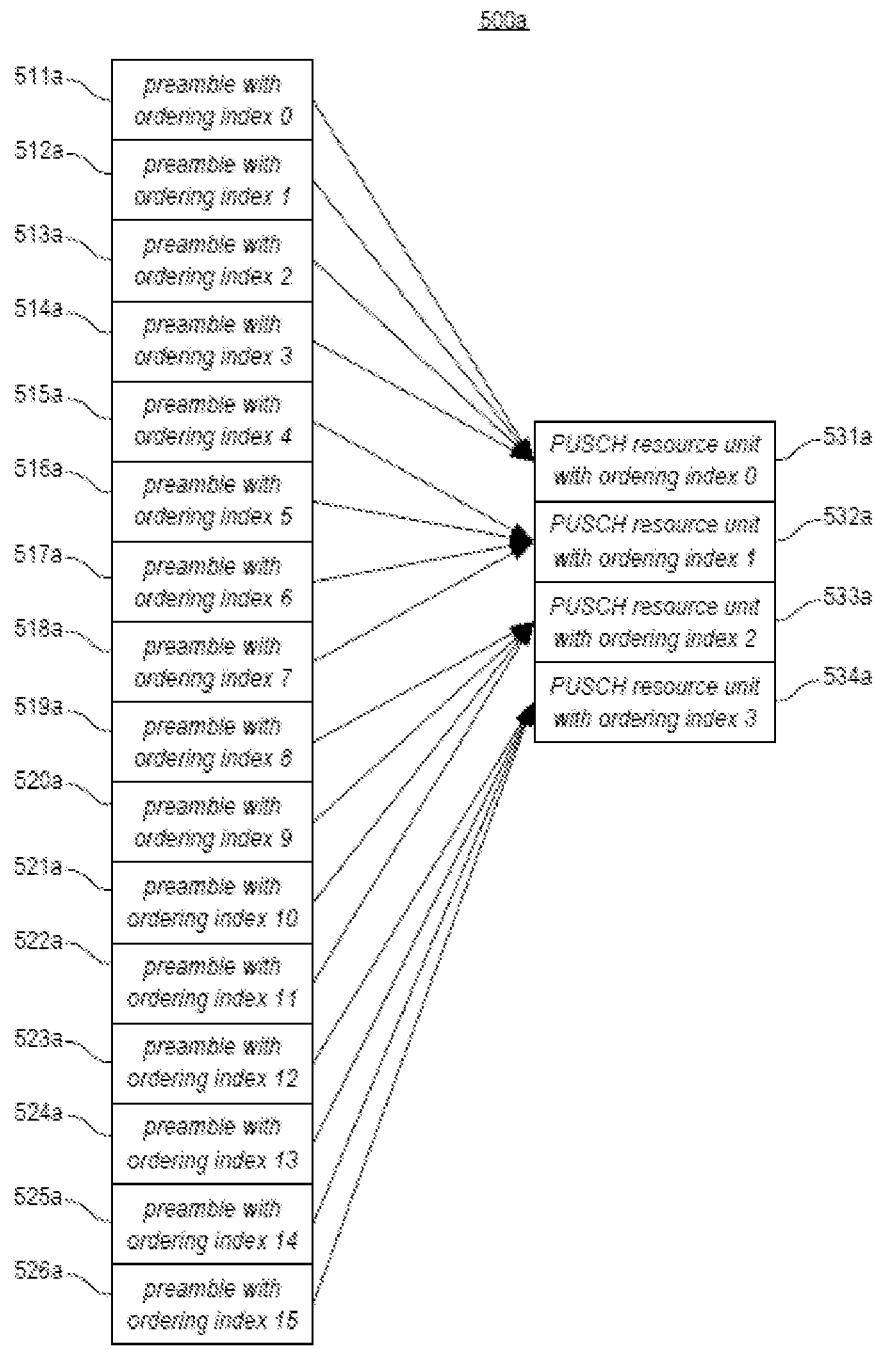
FIG. 5A illustrates an evenly divided scenario of an example mapping scheme, in accordance with some embodiments of the present disclosure.
Figure 5B:
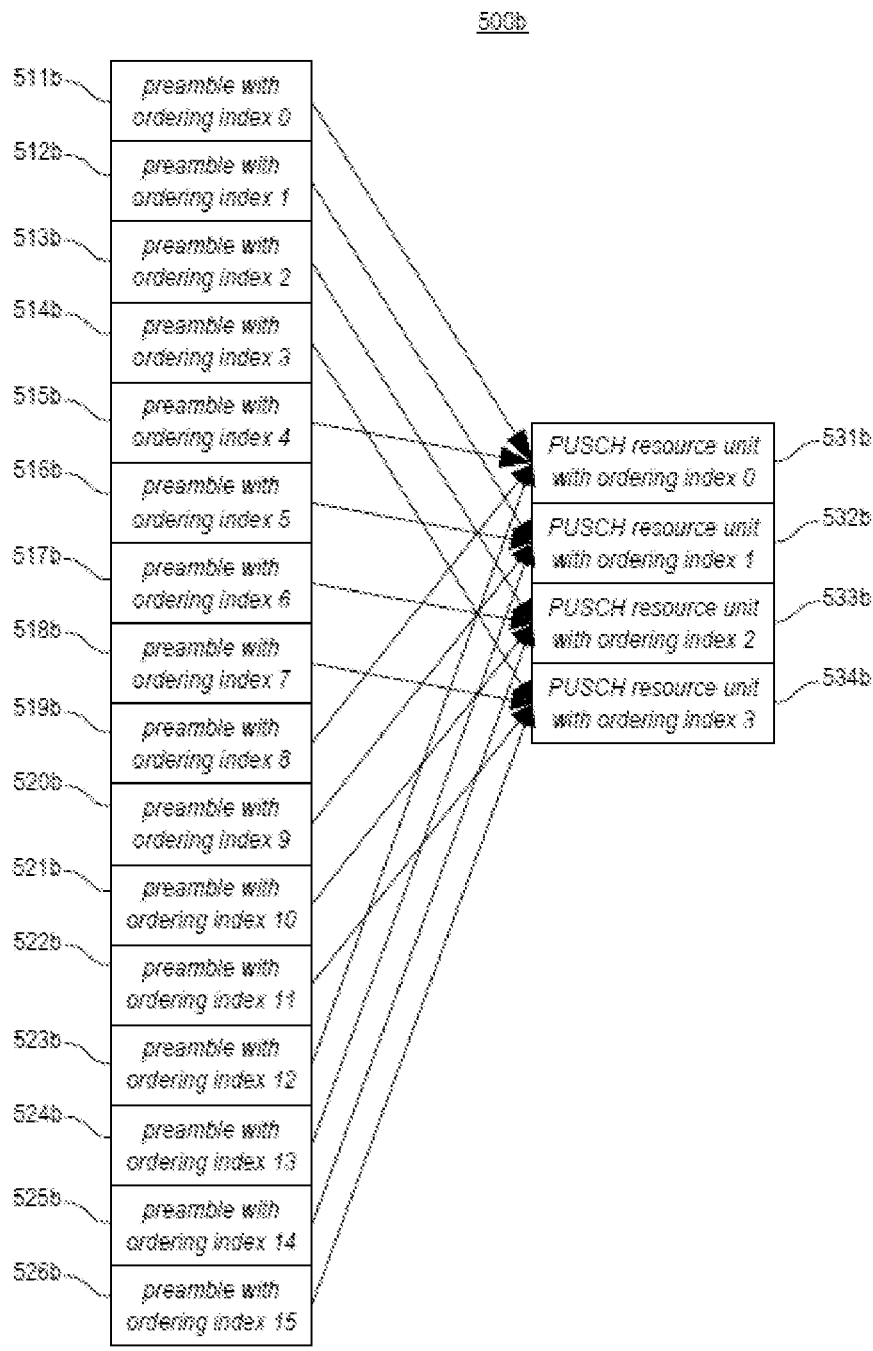
FIG. 5B illustrates an evenly divided scenario of an example mapping scheme, in accordance with some embodiments of the present disclosure.
Figure 5C:
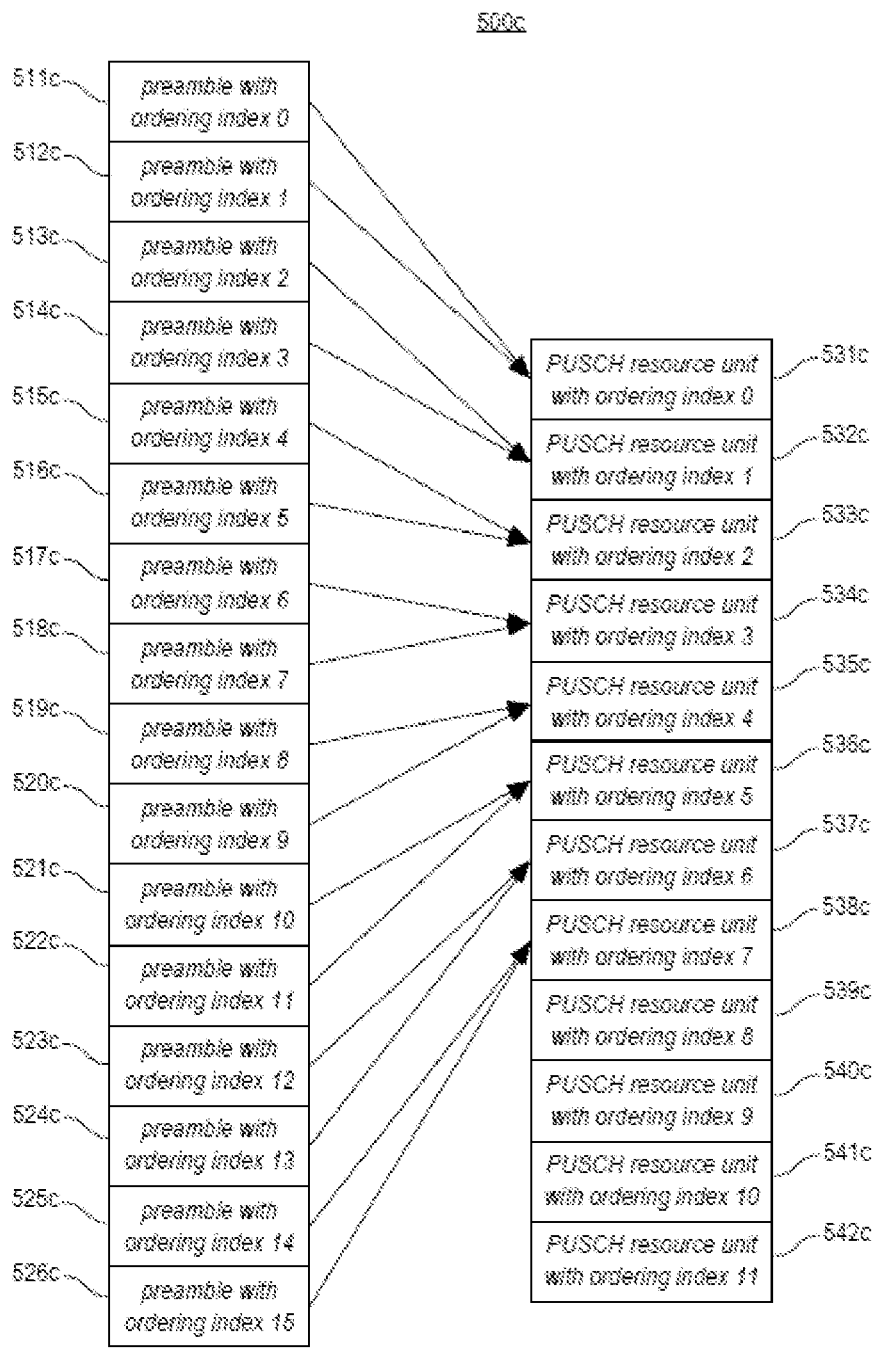
FIG. 5C illustrates an unevenly divided scenario of an example mapping scheme, in accordance with some embodiments of the present disclosure.
Figure 5C:
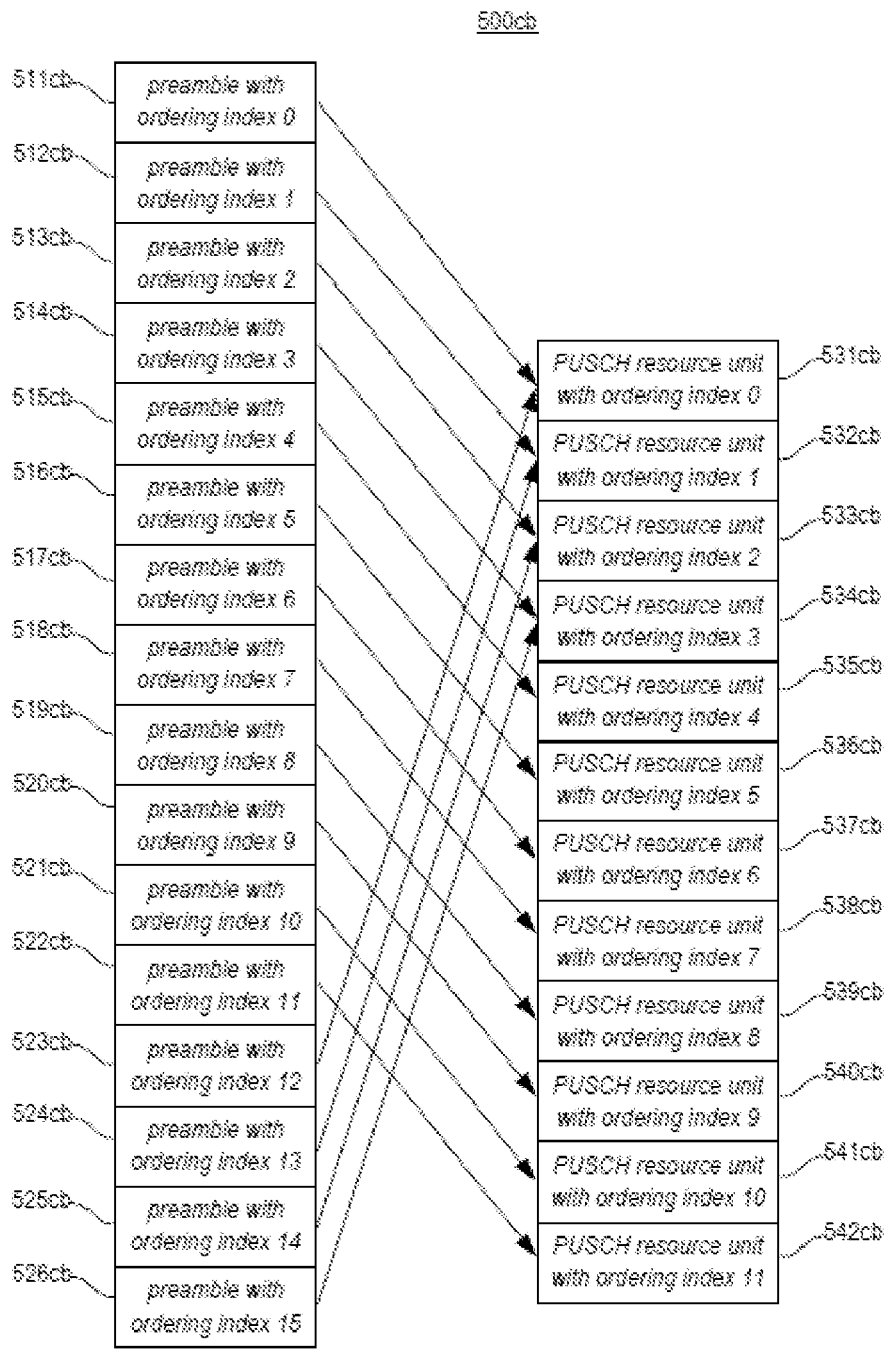

For instance, a first example mapping scheme relate to the configuration mapping ratio being, for example, greater than 1, and with conventional ordering. FIGS. 5A-5C illustrate scenarios (evenly divided and unevenly divided) for the first example mapping scheme. "PUSCH resource unit" or "PUSCH unit" refers to a channel resource that carries a payload.

FIG. 5A illustrates an evenly divided scenario 500a of the first example mapping scheme, in accordance with some embodiments of the present disclosure. Referring to FIGS. 1B-5A, in the evenly divided scenario 500a, preambles with order indexes 0-3 511a-514a are mapped to or otherwise associated with PUSCH resource unit with ordering index 0 531a. Preambles with order indexes 4-7 515a-518a are mapped to or otherwise associated with PUSCH resource unit with ordering index 1 532a. Preambles with order indexes 8-11 519a-522a are mapped to or otherwise associated with PUSCH resource unit with ordering index 2 533a. Preambles with order indexes 12-15 523a-526a are mapped to or otherwise associated with PUSCH resource unit with ordering index 3 534a. Accordingly, each of the PUSCH resource units 531a-534a is mapped to 4 preambles. An example expression describing the evenly divided scenario 500a is:

PUSCH_unit_ordering_index=floor (preamble_ordering_index/X);

where PUSCH_unit_ordering_index refers to the ordering index of the PUSCH resource units 531a-534a, preamble_ordering_index refers to the ordering index of the preambles 511a-526a, and X corresponds to a mapping ratio (greater than 1). Here, X is 4.

FIG. 5B illustrates an evenly divided scenario 500b of the first example mapping scheme, in accordance with some embodiments of the present disclosure. Referring to FIGS. 1B-5B, in the evenly divided scenario 500b, preambles with order index 0 511b, order index 4 515b, order index 8 519b, and order index 12 523b are mapped to or otherwise associated with the PUSCH resource units with ordering index 0 531b. The preambles with order index 1 512b, order index 5 516b, order index 9 520b, and order index 13 524b are mapped to or otherwise associated with the PUSCH resource units with ordering index 1 532b. The preambles with order index 2 513b, order index 6 517b, order index 10 521b, and order index 14 525b are mapped to or otherwise associated with the PUSCH resource units with ordering index 2 533b. The preambles with order index 3 514b, order index 7 518b, order index 11 522b, and order index 15 526b are mapped to or otherwise associated with the PUSCH resource units with ordering index 3 534b. Accordingly, each of the PUSCH resource units 531b-534b is mapped to 4 preambles. An example expression describing the evenly divided scenario 500b is:

PUSCH_unit_ordering_index=mod (preamble_ordering_index, Q);

where PUSCH_unit_ordering_index refers to the ordering index of the PUSCH resource units 531b-534b, preamble_ordering_index refers to the ordering index of the preambles 511b-526b, and Q corresponds to a total number of POs within a PO group (e.g., multiple POs) associated with the preambles. In an example, Q=12.

FIG. 5C illustrates an unevenly divided scenario 500c of the first example mapping scheme, in accordance with some embodiments of the present disclosure. Referring to FIGS. 1B-5C, in the unevenly divided scenario 500c, preambles with order indexes 0-1 511c-512c are mapped to or otherwise associated with PUSCH resource unit with ordering index 0 531c. Preambles with order indexes 2-3 513c-514c are mapped to or otherwise associated with PUSCH resource unit with ordering index 1 532c. Preambles with order indexes 2-3 513c-514c are mapped to or otherwise associated with PUSCH resource unit with ordering index 1 532c. Preambles with order indexes 4-5 515c-516c are mapped to or otherwise associated with PUSCH resource unit with ordering index 2 533c. Preambles with order indexes 6-7 517c-518c are mapped to or otherwise associated with PUSCH resource unit with ordering index 3 534c. Preambles with order indexes 8-9 519c-520c are mapped to or otherwise associated with PUSCH resource unit with ordering index 4 535c. Preambles with order indexes 10-11 521c-522c are mapped to or otherwise associated with PUSCH resource unit with ordering index 5 536c. Preambles with order indexes 12-13 523c-524c are mapped to or otherwise associated with PUSCH resource unit with ordering index 6 537c. Preambles with order indexes 13-14 524c-525c are mapped to or otherwise associated with PUSCH resource unit with ordering index 7 538c. None of the preambles 511c-526c are mapped to the PUSCH resource units with ordering indexes 8-11 539c-542c, resulting in uneven mapping. These PUSCH resource units will not be used with the preambles for 2-step RACH transmission. An example expression describing the unevenly divided scenario 500c is:

PUSCH_unit_ordering_index=floor (preamble_ordering_index, X);

where PUSCH_unit_ordering_index refers to the ordering index of the PUSCH resource units 531c-542c, preamble_ordering_index refers to the ordering index of the preambles 511c-526c, and X corresponds to a mapping ratio (greater than 1). In one example, X is 2.

FIG. 5CB illustrates an unevenly divided scenario 500cb of the first example mapping scheme, in accordance with some embodiments of the present disclosure. Referring to FIGS. 1B-5CB, in the unevenly divided scenario 500cb, a preamble with order index 0 511cb and a preamble with order index 12 523cb are mapped to or otherwise associated with a PUSCH resource unit with ordering index 0 531cb. A preamble with an order index 1 512cb and a preamble with an order index 13 524cb are mapped to or otherwise associated with a PUSCH resource unit with ordering index 1 532cb. A preamble with an order index 2 513cb and a preamble with an order index 14 525cb are mapped to or otherwise associated with a PUSCH resource unit with ordering index 2 533cb. A preamble with an order index 3 514cb and a preamble with an order index 15 526cb are mapped to or otherwise associated with a PUSCH resource unit with an ordering index 3 534cb. Preambles with order indexes 4-11 515cb-522cb are mapped to or otherwise associated with PUSCH resource units with ordering indexes 4-11 535cb-542cb. An example expression describing the unevenly divided scenario 500cb is:
PUSCH_unit_ordering_index=mod (preamble_ordering_index, Q);

where PUSCH_unit_ordering_index refers to the ordering index of the PUSCH resource units 531cb-542cb, preamble_ordering_index refers to the ordering index of the preambles 511cb-526cb, and X corresponds to a mapping ratio (greater than 1). In one example, Q is 12.

In the first example mapping scheme, the preamble ordering indexes and PUSCH resource unit ordering indexes can be obtained with the following principles:

In some examples, the preamble_ordering_index is obtained by rearranging the preambles from an RO or an RO group (containing multiple ROs) following an order principle such as:

(1) in increasing order of preamble indexes within a single RO;
(2) next, in increasing order of frequency resource indexes for frequency multiplexed ROs;
(3) next, in increasing order of time resource indexes for time multiplexed ROs.

In some examples, the PUSCH_unit_ordering_index is obtained by rearranging the PUSCH resource units following an order principle such as"

(1) in increasing order of DMRS indexes within a single PO;
(2) next, in increasing order of frequency resource indexes for frequency multiplexed POs;
(3) next, in increasing order of time resource indexes for time multiplexed POs; where the DMRS indexes are a linear transformation of DMRS port/sequence indexes.

FIG. 5D illustrates a second example mapping scheme, in accordance with some embodiments of the present disclosure. FIG. 5D is a diagram 500d illustrating the correspondence between an RO and beams, in accordance with some embodiments of the present disclosure. Referring to FIGS. 1B-5D, each of SSBs 501d-504d corresponds to a respective one of beams 511d-514d. The beams 511d-514d may differ from each other with respect to directions, as shown (the beams 511d-514d refer to the shaded beams). For instance, the direction of the beam 511d corresponds to SSB0 501d. The direction of the beam 512d corresponds to SSB1 502d. The direction of the beam 513d corresponds to SSB2 503d. The direction of the beam 514d corresponds to SSB3 504d. For an RO 520d, a certain number (e.g., M) of preambles dedicated for the 2-step RACH procedure 100b are specified. In the diagram 500d, a certain number (e.g., 4) SSBs (e.g., the SSBs 501d-504d) is assigned for the RO 520d, e.g., SSBperRO=4. As such, the M preambles can be divided into 4 sets, where the preambles in each set have consecutive preamble indexes. The indexes between different preamble sets may not be consecutive. In one example in which M is 48, the preamble index numbers for a first preamble set may be 0-11, the preamble index numbers for a second preamble set may be 16-27, the preamble index numbers for a third preamble set may be 32-43, and the preamble index numbers for a fourth preamble set may be 48-59.

FIG. 5E illustrates a third example mapping scheme. FIG. 5E is a diagram 500e illustrating the correspondence between an RO group (including multiple ROs) and beams, in accordance with some embodiments of the present disclosure. Referring to FIGS. 1B-5E, each of SSBs 501e-504e corresponds to a respective one of beams 511e-514e. The beams 511e-514e may differ from each other with respect to directions, as shown (the beams 511e-514e refer to the shaded beams). For instance, the direction of the beam 511e corresponds to SSB0 501e. The direction of the beam 512e corresponds to SSB1 502e. The direction of the beam 513e corresponds to SSB2 503e. The direction of the beam 514e corresponds to SSB3 504e. For an RO group 530e, a certain number (e.g., M) of preambles dedicated for the 2-step RACH procedure 100b are specified, where the preambles are from multiple ROs 520e-521e within the RO group 530e. In the diagram 500e, a certain number (e.g., 4) SSBs (e.g., the SSBs 501e-504e) is assigned for the RO group 530e, e.g., SSBperRO=4. As such, the M preambles can be divided into 4 sets, where the preambles in each set have consecutive preamble indexes. The indexes between different preamble sets may not be consecutive and may come from different ROs. Therefore the indexes may be the same for the preamble set corresponding to different beams In one example in which Q is 48 and there are 2 ROs associated with, the preamble index numbers for a first preamble set may be 0-5, the preamble index numbers for a second preamble set may be 16-21, the preamble index numbers for a third preamble set may be 32-37, and the preamble index numbers for a fourth preamble set may be 48-53.

The wireless communication device 300 can use the preamble index to determine corresponding PUSCH resource units, which can be used by the BS 200 to determine the payload corresponding to the preamble. Each PUSCH resource unit can be determined based on time, frequency, DMRS. DMRS can be determined based on DMRS sequence, OCC, and CDM group. The PUSCH resource unit can be arranged to prioritize CDM groups, such that DMRSs from different CDM groups are assigned for the preambles allocated to the same beam or SSB. In one example in which 16 preambles are assigned to a given beam, and 18 CDM groups are present, the DMRSs from the 18 CDM are assigned to the PUSCH resource units corresponding to the 16 preambles. In another example in which 16 preambles are assigned to a given beam, and 12 CDM groups are present, the DMRSs from the 12 CDM are assigned to the PUSCH resource units corresponding to 12 of the 16 preambles. The remaining 4 preambles can be associated with remaining PUSCH resource units, for example, according to additional criteria such as time or frequency.

Figure 5F:
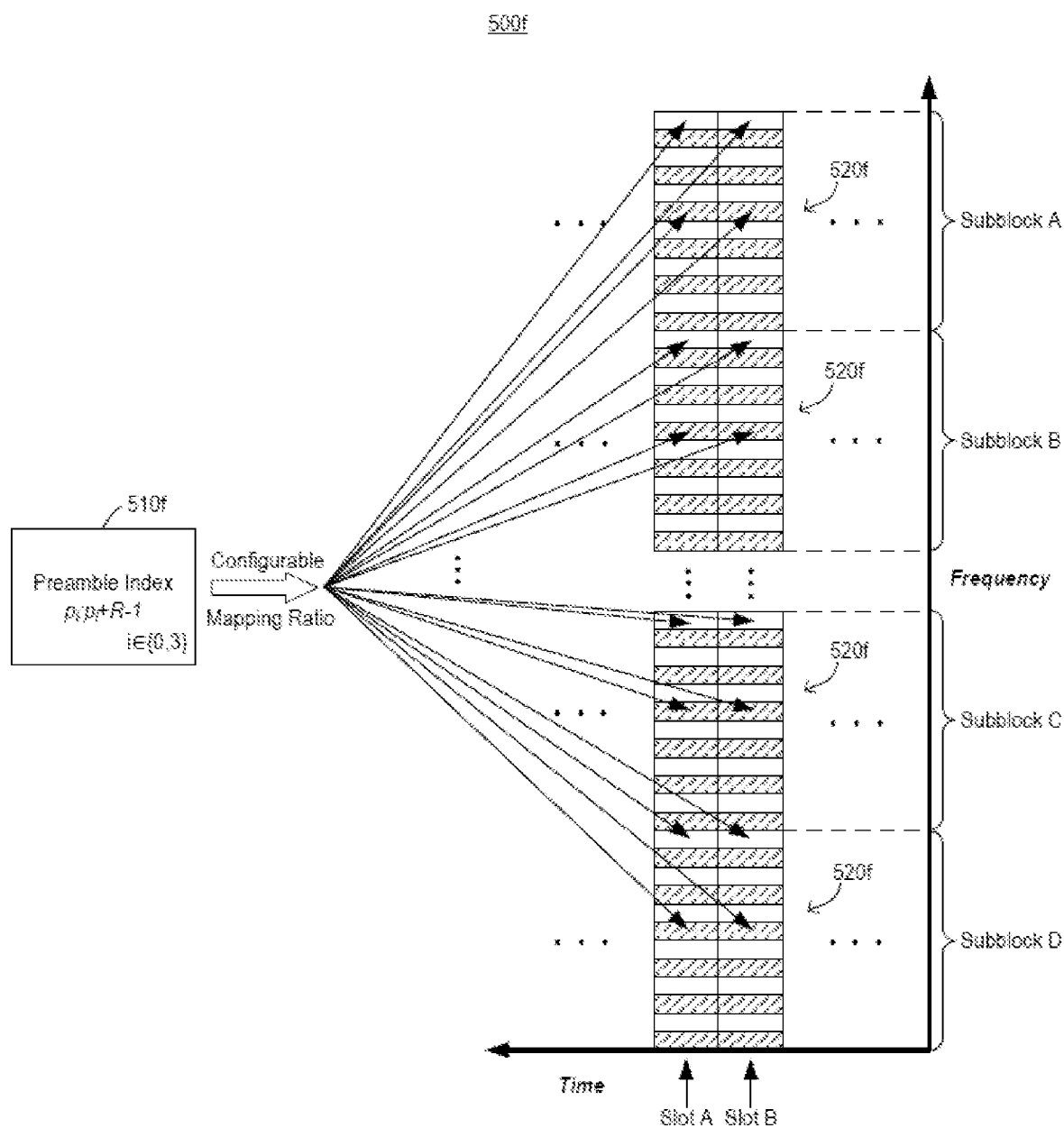
FIG. 5F is a diagram illustrating association of a preamble index with POs based on CDM groups (with respect to the second and third example mapping scheme), in accordance with some embodiments of the present disclosure.

FIG. 5F is a diagram 500f illustrating association of a preamble set 510f with POs 520f based on CDM groups (with respect to the second and third example mapping scheme), in accordance with some embodiments of the present disclosure. Referring to FIGS. 1B-5F, the POs 520f as shown form a PO group. As described, the POs 520f can be defined or otherwise determined based on frequency, time, and DMRS, and DMRS can be defined or otherwise determined based on OCC, CDM groups, and DMRS sequence. For example, the POs 520f as shown can be defined based on subblocks A-D on the frequency axis, where the subblocks are defined for frequency granularity. The POs 520f as shown are defined based on slots A and B in the time axis. Furthermore, all shaded components of the POs 520f correspond to DMRS of a first CDM group, and all empty components of the POs 520f correspond to DMRS of a second CDM group. Accordingly, the POs 520f can be defined based on DMRS of two CDM groups.

The preamble set 510f include the preamble index numbers of the RO 520d or the RO group 530e. As shown in the diagram 500f, the preamble set 510f for each SSB (e.g., for each i) is mapped to the POs 520f having different CDM groups. The mapping or association of a preamble set 510f with POs 520f can be based on a configurable mapping ratio.

With regard to the second example mapping scheme (FIG. 5D), the configuration mapping ratio can be, for example, 1, without sequence with re-shuffled DMRS index prioritizing CDM group followed by OCC pattern only. The association is fabricated beam-by-beam. The preamble ordering index can be obtained by rearranging the 2-step RACH preambles corresponding to a given beam following an example order principle such as:
(1) in increasing order of preamble indexes within a single RACH occasion;
(2) next, in increasing order of frequency resource indexes for frequency multiplexed PUSCH occasions; and
(3) next, in increasing order of time resource indexes for time multiplexed RACH occasions;
where DMRS indexes correspond to a linear transformation of DMRS port/sequence indexes.

In some examples, the PUSCH resource unit ordering index is obtained by rearranging the PUSCH resource units corresponding to a given beam following an example order principle such as a first example order principle, second example order principle, and third example order principle.

In the first example order principle:
(1) in increasing CDM group indexes of the DMRS of the POs within the PO group; and
(2) next, in increasing OCC pattern and/or DMRS sequences related indexes of the DMRS of the POs within the PO group. The POs are arranged first in increasing order of frequency resource indexes for frequency multiplexed POs. Next, the POs are arranged in an increasing order of time resource indexes for time multiplexed POs.

In the second example order principle:
(1) in increasing CDM group indexes of the DMRS of the POs within the PO group;
(2) next, in increasing order of frequency resource indexes for frequency multiplexed POs;
(3) next, in increasing order of time resource indexes for time multiplexed ROs; and
(4) next, in increasing OCC pattern and/or DMRS sequences related indexes of the DMRS of the POs within the PO group.

The third example order principle is used for OCC pattern and/or DMRS sequences available for 2 step RACH msgA transmission. In the third example order principle:
(1) in increasing CDM group indexes of the DMRS of the POs within the PO group;
(2) next, in increasing order of frequency resource indexes for frequency multiplexed POs; and
(3) next, in increasing order of time resource indexes for time multiplexed ROs.

For remaining preambles and DMRS (not associated per the principles above), the association can be performed following the order principle of the first example mapping scheme.

The DMRS index from 1 or multiple POs could be re-shuffled prioritizing CDM group from different POs followed by OCC pattern and/or DMRS sequences from different POs. With regard to the third example mapping scheme (FIG. 5E,5F), the PUSCH units could be associated with the preambles using the configured mapping ratio including e.g.{1,2,3}.

Figure 5G:
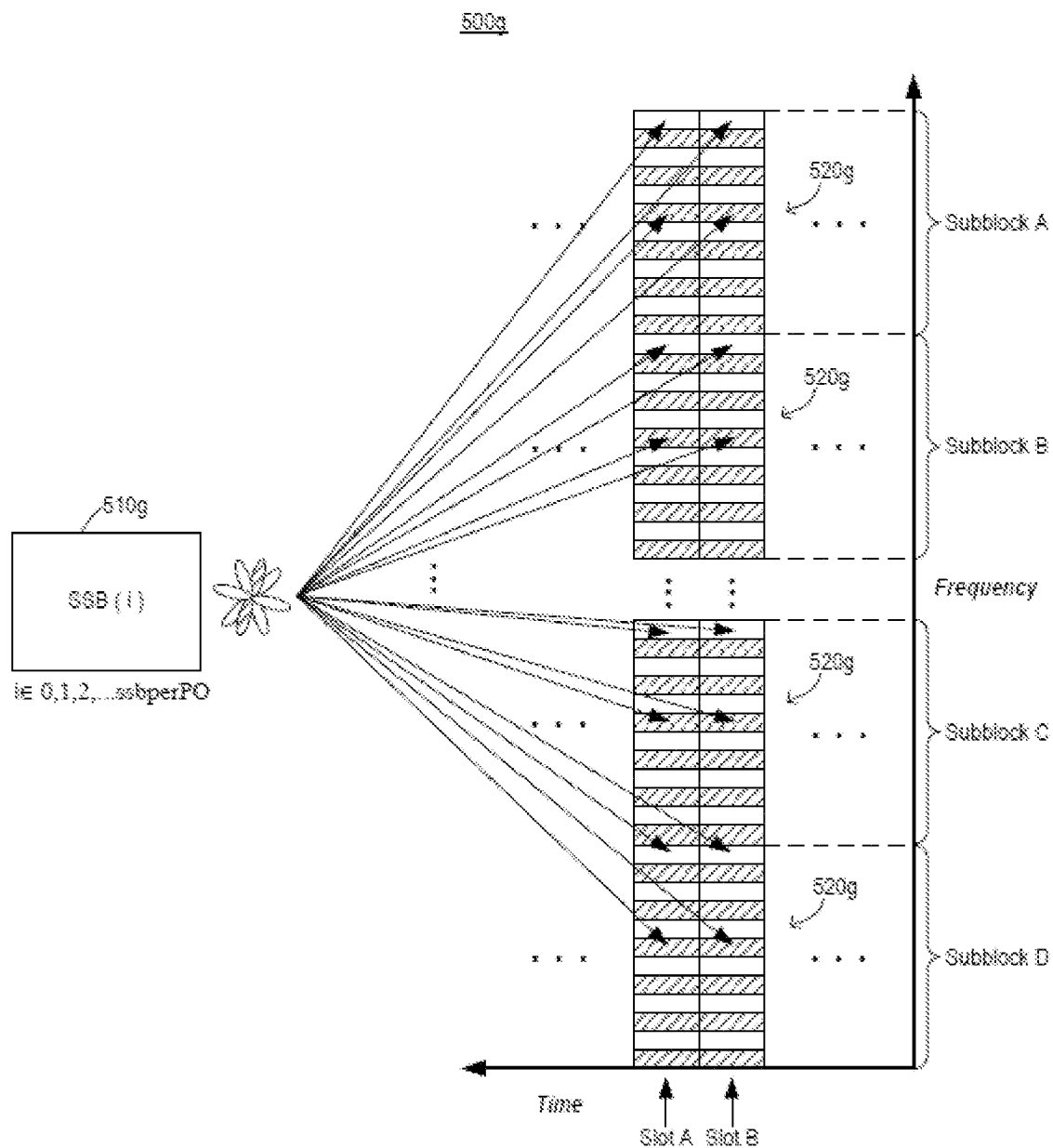
FIG. 5G is a diagram illustrating association of a SSB set with POs based on CDM groups (with respect to the second and third example mapping scheme), in accordance with some embodiments of the present disclosure.

FIG. 5G is a diagram 500g illustrating association of a SSB set 510g with POs 520g based on CDM groups (with respect to the second and third example mapping scheme), in accordance with some embodiments of the present disclosure. Referring to FIGS. 1B-5G, the diagram illustrates an embodiment in which the POs 520g are configured based on the SSB independently, such that the SSB (e.g., the SSB set 510g) is mapped directly to the PUSCH resource units (e.g., the POs 520g). The preamble to PUSCH resource unit mapping is based on the criterion of using the same beam, e.g., preambles and the PUSCH resource units that have been mapped to the same beam are mapped together. The POs 520g as shown form a PO group. As described, the POs 520g can be defined or otherwise determined based on frequency, time, and DMRS, and DMRS can be defined or otherwise determined based on OCC, CDM groups, and DMRS sequence. For example, the POs 520g as shown can be defined based on subblocks A-D on the frequency axis, where the subblocks are defined for frequency granularity. The POs 520g as shown are defined based on slots A and B in the time axis. Furthermore, all shaded components of the POs 520g correspond to DMRS of a first CDM group, and all empty components of the POs 520g correspond to DMRS of a second CDM group. Accordingly, the POs 520g can be defined based on DMRS of two CDM groups.

The SSB set 510g includes SSBs and can be mapped to the POs 520g based on the beam index i. As shown in the diagram 500g, the SSB set 510g (e.g., for each beam i) is mapped to different CDM groups of the POs 520g.

In a fourth example mapping scheme, suppose SSBperRO=4, and R preambles (e.g., M/4=R) are associated with each SSB 501a-504a or 501b-504b. The R preambles are mapped to the DMRS from different CMD groups first with the increase of preamble index. An example formulation for the mapping may be based on the following:

TABLE 1

| (SSB, preamble) | (PO, DMRS pattern, CDM Group) |
|---|---|
| (k, r) | (n, l, g) |

The preamble index (preambleIdx) can be converted into an ordering index r within a given group, for example, using the following expression:

$r = \text{mod}(\text{preambleIdx}, \text{totalNumerof2stepRA\_Preambles}/K)$;

r=0, 1, 2, . . . R−1;

where preambleIdx denotes original preamble index numbers associated with the RO 520a or the group RO 530b. The expression totalNumerof2stepRA_Preambles/K corresponds to a starting point. The totalNumerof2stepRA_Preambles is determined by the BS 200, and corresponds to M. K denotes SSBperRO.

CDM group index g can be determined based on r, for example, using the following expression:

$g = \text{mod}(r, G)$;

where: r=n*G+g;
and G is a number of total CDM groups, and n is the index number for the PO. In one example, n can be determined using the following expression:

$n = \text{floor}(r, G)$;

n=0, 1, 2 . . . , N−1;
g=0, 1, 2, . . . , G−1;
l=k;
k=0, 1, 2, . . . , K−1;

The determination of l, g, n can be used to determine the PUSCH resource unit or a location thereof corresponding to the preamble. Accordingly, the preambles associated with the same SSB (beam) can be prioritized to be associated with DMRSs from different CDM groups. For the remaining preambles and PUSCH resource units, the increasing order of index/frequency/time can be pursued.

In a fifth example mapping scheme, a mapping formula is used for mapping as described herein, where the mapping formula has an upper bound for a number of SSBs associated with PO groups. In an illustrative example, suppose ssbperRO=4, and R preambles (e.g., M/4=R) are associated with each SSB 501a-504a or 501b-504b. The R preambles are mapped to the DMRS from different CMD groups first with the increase of preamble index. In the second example, due to latency requirement, at most W beams (W SSBs) are allowed within a PO. An example formulation for the mapping may be based on the following:

TABLE 2

| (SSB, preamble) | (PO, DMRS pattern, CDM Group) |
|---|---|
| (k, r) | (n, l, g) |

The preamble index (preambleIdx) can be converted into an ordering index r within a given group, for example, using the following expression:

$r = \text{mod}(\text{preambleIdx}, \text{totalNumerof2stepRA\_Preambles}/K)$;

r=0, 1, 2, . . . R−1;

where preambleIdx denotes original preamble index numbers associated with the RO 520a or the group RO 530b. The expression totalNumerof2stepRA_Preambles/K corresponds to a starting point. The totalNumerof2stepRA_Preambles is determined by the BS 200, and corresponds to M. K denotes SSBperRO.

CDM group index g can be determined based on r, for example, using the following expression:

$g = \text{mod}(r, G)$;

where: r=n*G+g;
and G is a number of total CDM groups, and n is the index number for the PO. In one example, n can be determined using the following expression:

$n = \text{floor}(r, G)$;

n=0, 1, 2 . . . , N−1;
g=0, 1, 2, . . . , G−1;
l=k;
l=0, 1, 2, . . . , W−1;

The determination of l, g, n can be used to define the PUSCH resource unit or a location thereof corresponding to the preamble. Accordingly, the preambles associated with the same SSB (beam) can be prioritized to be associated with DMRSs from different CDM groups. For the remaining preambles and PUSCH resource units, the increasing order of index/frequency/time can be pursued.

In a sixth example scheme, PUSCH resource units with different CDM groups are associated with a given beam with the following order
(1) in increasing CDM group indexes of the DMRS of the POs within the PO group;
(2) next, in increasing order of frequency resource indexes for frequency multiplexed POs; and
(3) next, in increasing order of time resource indexes for time multiplexed ROs.

The POs can be configured following the NR configured grant in principle. The mapping of preamble and PUSCH resources units could based on the criterion that the same beam is used. The mapping ratio could be configurable with values from{1,2,3}.In some examples, some variables are needed for associating the M preambles and $N_{tot}$ PUSCH resource units. With respect to the relationship among such variables, the M preambles mapped to a PO or a PO group (including multiple POs) can correspond to one or multiple ROs. Multiple POs that are consecutive in the time domain and in the frequency domain belong to a PO group. Multiple ROs that are consecutive in the time domain and in the frequency domain belong to a RO group. In some examples, multiple ROs belong to a same PRACH slot.

In some examples, a number of preambles M can be determined using an expression such as:

$M = (R * N_t^{RA,slot} * N_f^{RA,slot})$;

where R is a number of preambles used for the 2-step RACH procedure 100b per RO, $N_t^{RA,slot}$ and $N_f^{RA,slot}$ are a number of time multiplexed ROs and a number of frequency multiplexed ROs configured in a RO group (including PRACH slot), respectively.

In some examples, a number of POs associated with the M preambles is referred to as Ng, and can be determined using an expression such as:

$Ng = (N_p * N_t^{PO,group} * N_f^{PO,group})$;

where $N_p$ is a number of PUSCH resource units per PO, $N_t^{PO,group}$ and $N_f^{PO,group}$ are a number of time multiplexed POs and a number of frequency multiplexed POs configured in a PO group, respectively.

In some examples, a number of total PUSCH resource units $N_{tot}$ can be determined using an expression such as:

$$N_{tot} = \sum_{i=1}^{Ng} N_{dmsr}(i);$$

where Ng=1 included, and $N_{dmsr}(i)$ can be determined using an expression such as:

$$N_{dmsr}(i) = N_{dmrs\_cdm}(i) * N_{dmrs\_occ}(i) * N_{dmrs\_seq}(i);$$

In some examples, $N_{dmsr}(i)$ can be identical for all I, and signalling overhead reduction can be achieved. In an example in which $N_{dmsr}(i)$ is identical for all i, $N_{dmsr}(i)$ can be denoted as $N_{dmrs}$. The minimum of Ng can be obtained from the following expression where M and the mapping ratio r can be described:

$$Ng = \text{ceil}(M/(N_{dmsr}*r));$$

where r can be broadcasted in the SI or in RRC messages, and the value of r can be defined as r={1, 2, 3}.

In some examples, Ng can be further defined using an expression such as:

$$Ng = \sum_{i=1}^{N} Ni;$$

r=ceil (M/(Ng*$N_{dmsr}$));

In some examples, r can be derived from Ng. Ni denotes a number of POs of a given time and frequency resource size index f(i) that can either be fixed or broadcasted through SI (e.g. SIB2) or RRC messages. The values of Ni can be identical or different with varying i. Alternatively, only $N_{fdm}$ or $N_{tdm}$ can be configured.

The offset may not only be relative to the associated ROs. For example, the timing offset can also be configured separately from the ROs.

Figure 6A:
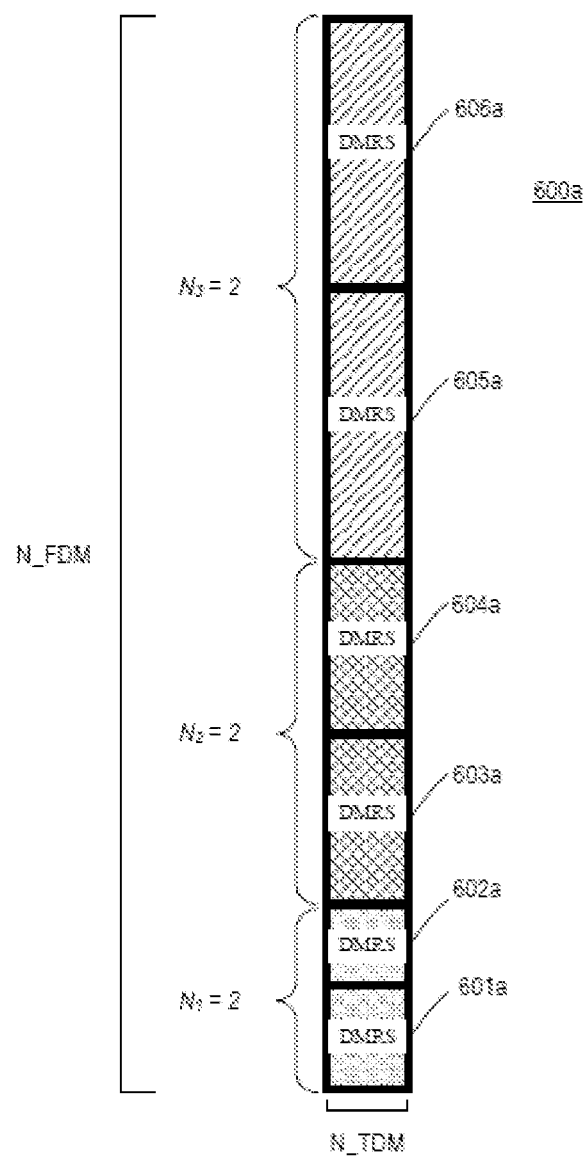
FIG. 6A is a diagram illustrating FDM (frequency domain multiplexed) POs occupying consecutive time and frequency resources, in accordance with some embodiments of the present disclosure.
Figure 6B:
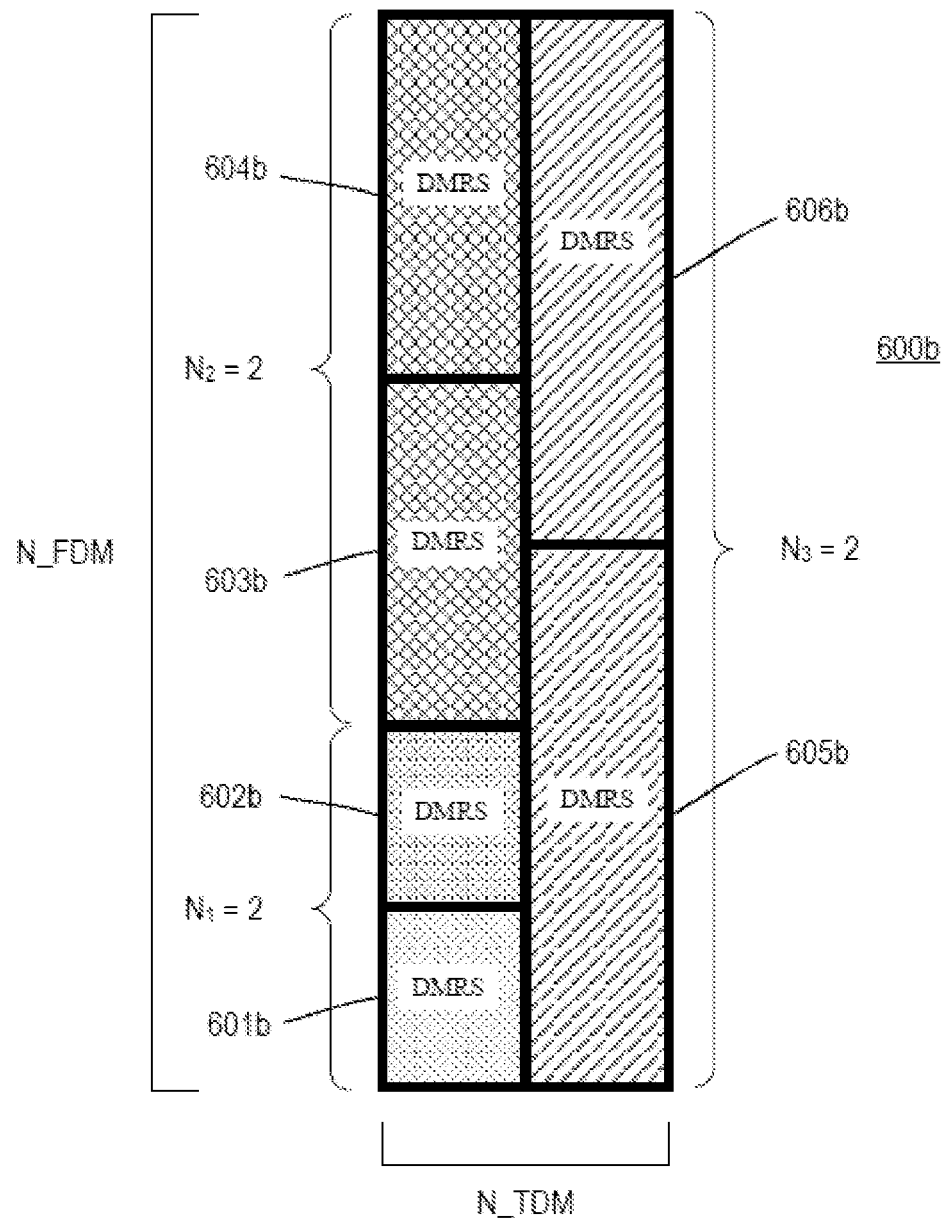
FIG. 6B is a diagram illustrating TDM (time domain multiplexed) and FDM (frequency domain multiplexed) POs, in accordance with some embodiments of the present disclosure.

In some examples, the number of POs can be determined from the number of POs of any given time and frequency resource sizes as shown in FIGS. 6A and 6B. FIG. 6A is a diagram illustrating FDM POs 600a occupying consecutive time and frequency resources, in accordance with some embodiments of the present disclosure. Referring to FIGS. 1B-6A, the POs 600a belong to a PO group, or the POs 600a include one or more POs associated with an RO or RO group. N1 denotes a number (e.g., 2) of POs of a given time and frequency resource size index f(1), and corresponds to DMRSs 601a and 602a. N2 denotes a number (e.g., 2) of POs of a given time and frequency resource size index f(2), and corresponds to DMRSs 603a and 604a. N3 denotes a number (e.g., 2) of POs of a given time and frequency resource size index f(3), and corresponds to DMRSs 605a and 606a. The POs 600a are defined by corresponding Nfdm and Ntdm values as shown. Accordingly, the PO pattern and number of POs can be determined from Nfdm and Ntdm.

FIG. 6B is a diagram illustrating TDM and FDM POs 600b, in accordance with some embodiments of the present disclosure. Referring to FIGS. 1B-6B, the POs 600b belong to a PO group, or the POs 600b include one or more POs associated with an RO or RO group. N1 denotes a number (e.g., 2) of POs of a given time and frequency resource size index f(1), and corresponds to DMRSs 601b and 602b. N2 denotes a number (e.g., 2) of POs of a given time and frequency resource size index f(2), and corresponds to DMRSs 603b and 604b. N3 denotes a number (e.g., 2) of POs of a given time and frequency resource size index f(3), and corresponds to DMRSs 605b and 606b. The POs 600b are defined by corresponding Nfdm and Ntdm values as shown.

Figure 6C:
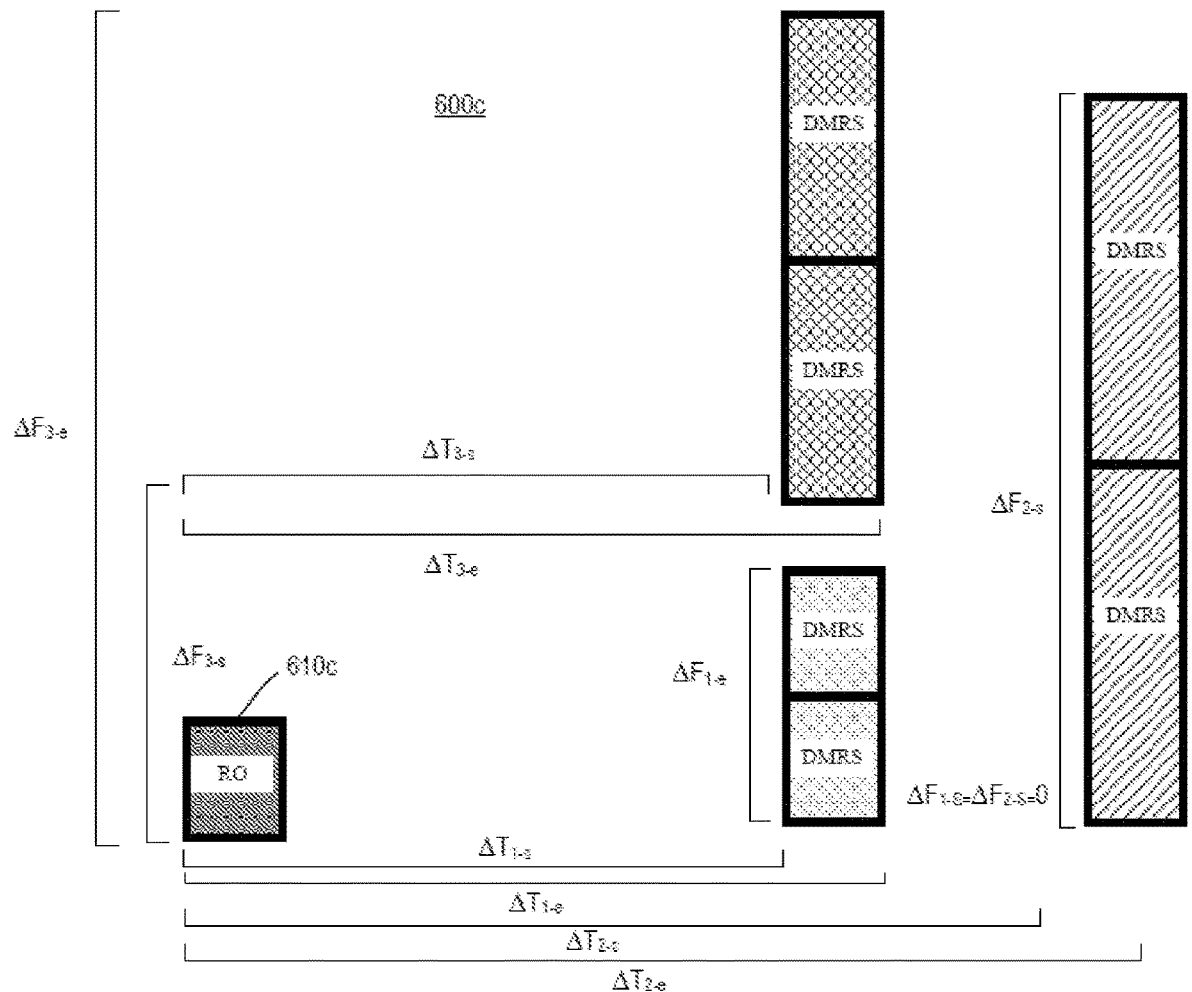
FIG. 6C is a diagram illustrating POs occupying non-consecutive time and frequency resources, in accordance with some embodiments of the present disclosure.

In some examples, the PO pattern and number of POs can be determined from starting/ending timing frequency/offsets for each PO. FIG. 6C is a diagram illustrating POs 600c occupying non-consecutive time and frequency resources, in accordance with some embodiments of the present disclosure. Referring to FIGS. 1B-6C, as shown, the non-consecutive time and frequency resources are indicated by the offsets only. The offsets can follow either a configured grant principle or a relative location the associated ROs 610c. The ΔTs and ΔFs as shown can be configured following a configured grant principle or relative to the one or more ROs 610c associated with the POs 600c.

Figure 6D:
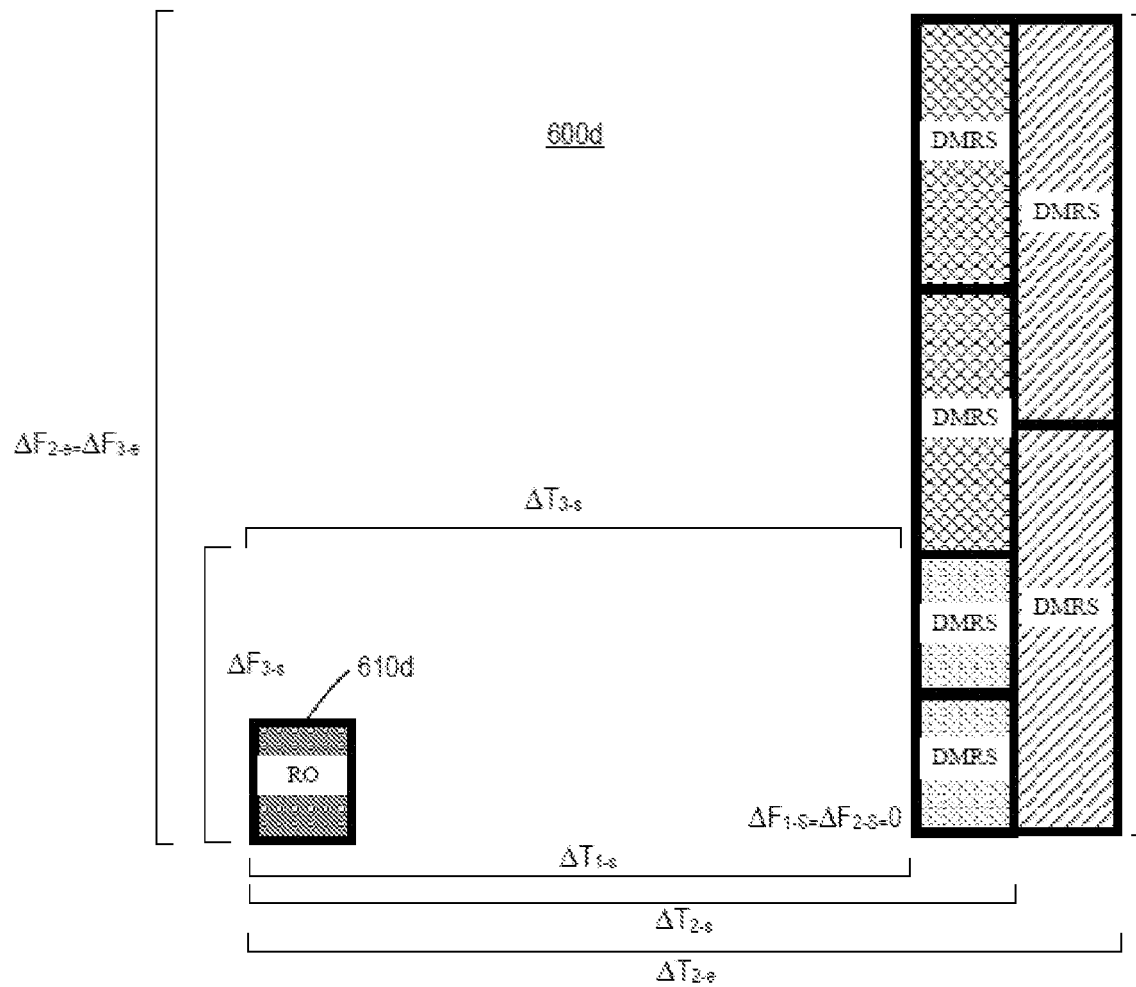
FIG. 6D is a diagram illustrating POs occupying time/frequency resources indicated by starting offsets and ending offsets of a boundary of non-consecutive time/frequency resources, in accordance with some embodiments of the present disclosure.

In some examples, the OCC pattern can be determined from a starting time/frequency offsets for consecutive POs. FIG. 6D is a diagram illustrating POs 600d occupying time/frequency resources indicated by starting offsets and ending offsets of a boundary of non-consecutive time/frequency resources, in accordance with some embodiments of the present disclosure. Referring to FIGS. 1B-6D, as shown, the offsets can include an ending part of some boundary between non-consecutive POs. The ΔT and ΔF as shown can be configured following a configured grant principle or relative to the one or more ROs 610d associated with the POs 600d.

Figure 6E:
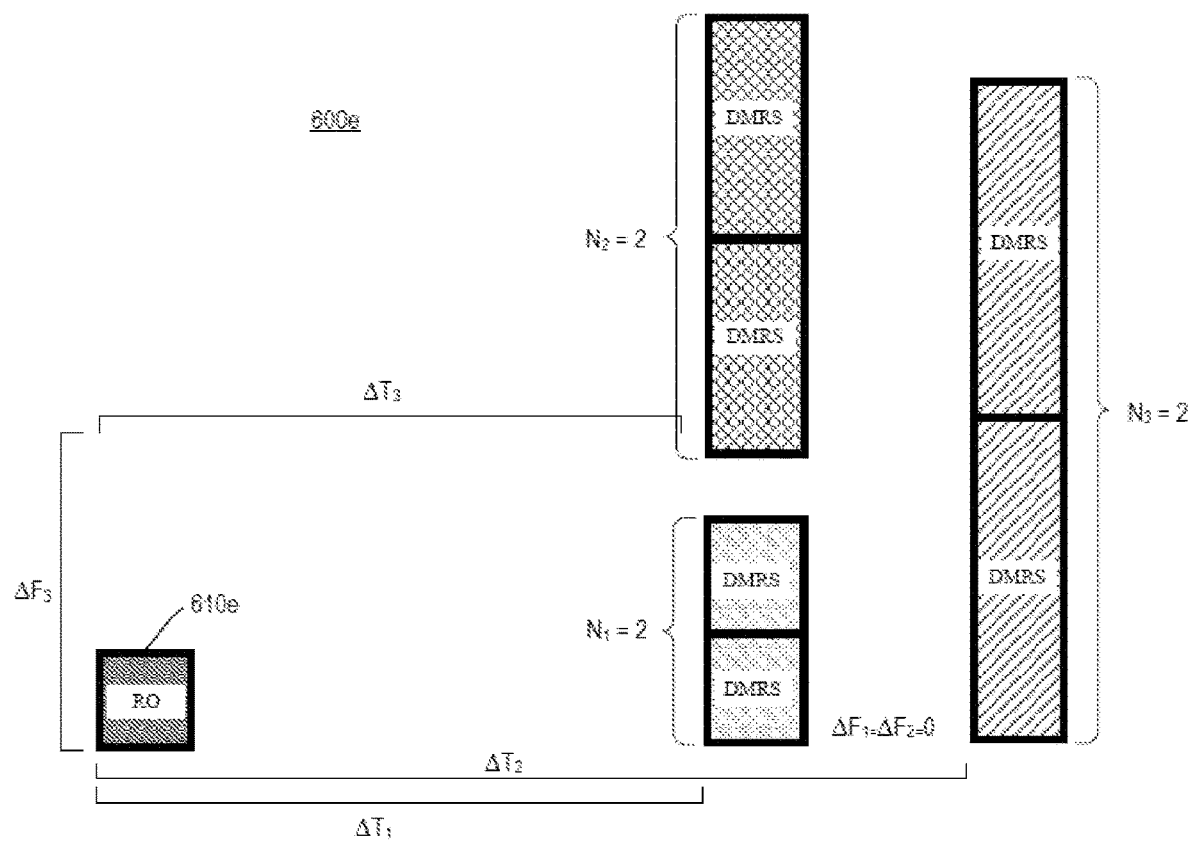
FIG. 6E is a diagram illustrating POs occupying time/frequency resources indicated by starting offsets together with a number of the POs, in accordance with some embodiments of the present disclosure.

In some examples, the PO pattern and number of POs can be determined from a starting timing/frequency offset plus the Ni assigned. FIG. 6E is a diagram illustrating POs 600e occupying time/frequency resources indicated by starting offsets together with a number of the POs 600e, in accordance with some embodiments of the present disclosure. Referring to FIGS. 1B-6E, in one example, the Ni assignment can follow the SSB to RO association rule in TR 38.213.

In some examples, the offset for the ending point of each PO can be saved if the PO time/frequency resource are broadcast or fixed in the specification. For the scenario where The POs are separately configured from the RO occasions, the offset can be configured following NR configured grant in principle. To save signaling, the number of each PO of different time and frequency resources can be fixed to be the same in the specification.

Figure 7:
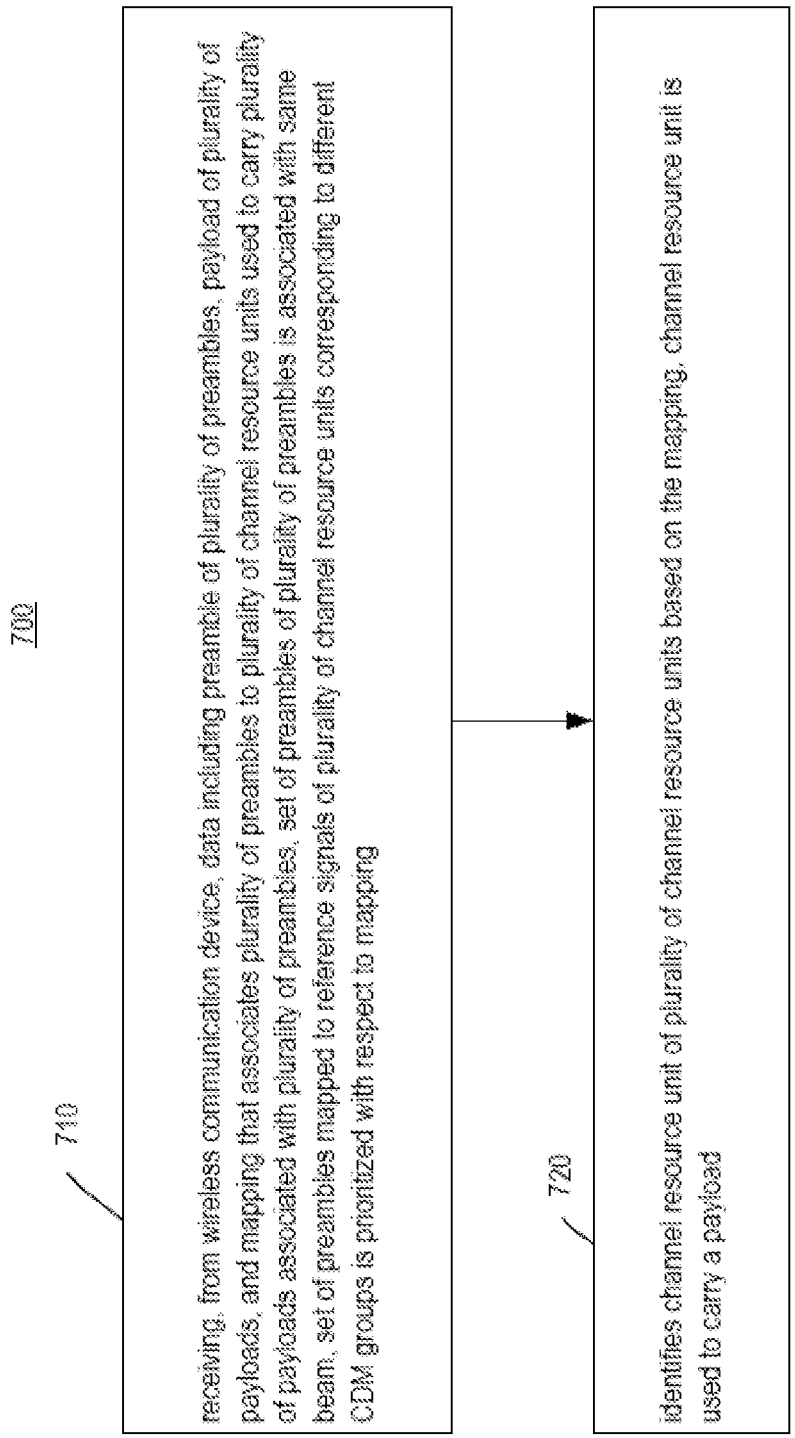
FIG. 7 illustrates a flow chart for a method for managing data transmission (including a preamble and a payload) between a wireless communication device and a BS, in accordance with some embodiments of the present disclosure.

FIG. 7 illustrates a flow chart for a method 700 for managing data transmission (including a preamble and a payload) between the wireless communication device 300 and the BS 200, in accordance with some embodiments of the present disclosure. Referring to FIGS. 1B-7, the method 700 is performed by the BS 200 and corresponds to the UE-side method 400. The method 700 involves identifying the channel resource unit using the mapping determined by the wireless communication device 300 (e.g., in the method 400).

At 710, the communication module 216 of the BS 200 receives, from the wireless communication device, data including a preamble of a plurality of preambles, a payload of a plurality of payloads, and a mapping that associates the plurality of preambles to a plurality of channel resource units used to carry the plurality of payloads associated with the plurality of preambles. A set of preambles of the plurality of preambles is associated with a same beam. The set of preambles is prioritized to be mapped to reference signals of the plurality of channel resource units corresponding to different CDM groups.

At 720, the mapping module 218 identifies a channel resource unit of the plurality of channel resource units based on the mapping. The channel resource unit is used to carry the payload.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
   determining, by a wireless communication device, a mapping, corresponding to a mapping ratio, that associates at least one preamble to at least one channel resource unit, wherein each of the at least one channel resource unit is used to carry at least one payload associated with a reference signal for the at least one payload; and
   performing, by the wireless communication device, a random access procedure based on the mapping, wherein determining the mapping comprises:
   mapping the at least one preamble to the at least one channel resource unit based on an increasing order of reference signal indexes of the reference signal and consecutive preamble indexes of the at least one preamble, wherein:
   the mapping ratio corresponds to an integer value greater than or equal to a ratio between a first parameter and a second parameter;
   the first parameter corresponds to a value representing a total number of the at least one preamble; and
   the second parameter corresponds to a value determined from combining a total number of the at least one channel resource unit and a total number of demodulation reference signal (DMRS) indexes.

2. The method of claim 1, wherein
   information about the at least one channel resource unit is determined based on configured values in a radio resource control (RRC) message; and
   the configured values comprise at least one of a number of frequency domain multiplexed physical uplink shared channel (PUSCH) occasions (Nfdm), a number of time domain multiplexed PUSCH occasions (Ntdm), or offsets to associated random access channel occasion.

3. The method of claim 1, wherein information about the at least one channel resource unit comprise a number of DMRS ports.

4. A wireless communication apparatus comprising at least one processor and a memory, wherein the at least one processor is configured to read code from the memory and implement a method recited in claim 1.

5. The method of claim 1, wherein the total number of DMRS indexes is determined based on at least one of:
   at least one DMRS sequence;
   at least one orthogonal cover code (OCC); or
   at least one code division multiplexing (CDM) group.

6. A wireless communication method, comprising:
   performing, by a base station with a wireless communication device, a random access procedure based on a mapping, corresponding to a mapping ratio, that associates at least one preamble to at least one channel resource unit, wherein each of the at least one channel resource unit is used to carry at least one payload associated with a reference signal for the at least one payload, wherein the mapping is determined by mapping the at least one preamble to the at least one channel resource unit based on an increasing order of reference signal indexes of the reference signal and consecutive preamble indexes of the at least one preamble, and wherein:
   the mapping ratio corresponds to an integer value greater than or equal to a ratio between a first parameter and a second parameter;
   the first parameter corresponds to a value representing a total number of the at least one preamble; and
   the second parameter corresponds to a value determined from combining a total number of the at least one channel resource unit and a total number of demodulation reference signal (DMRS) indexes.

7. A wireless communication apparatus comprising at least one processor and a memory, wherein the at least one processor is configured to read code from the memory and implement a method recited in claim 6.

8. A computer program apparatus comprising a computer-readable program medium code stored thereupon, the code, when executed by at least one processor, causing the at least one processor to implement a method recited in claim 6.

9. The method of claim 6, further comprising sending, by the base station to the wireless communication device, a radio resource control (RRC) message comprising configured values, wherein information about the at least one channel resource unit is determined by the wireless communication device based on the configured values in the RRC message; and the configured values comprise at least one of a number of frequency domain multiplexed physical uplink shared channel (PUSCH) occasions (Nfdm), a number of time domain multiplexed PUSCH occasions (Ntdm), or offsets to associated random access channel occasion.

10. The method of claim 6, wherein information about the at least one channel resource unit comprise a number of DMRS ports.

11. The method of claim 6, wherein the total number of DMRS indexes is determined based on at least one of:
    at least one DMRS sequence;
    at least one orthogonal cover code (OCC); or
    at least one code division multiplexing (CDM) group.

12. A computer program apparatus comprising a computer-readable program medium code stored thereupon, the code, when executed by at least one processor, causing the at least one processor to
    determine a mapping, corresponding to a mapping ratio, that associates at least one preamble to at least one channel resource unit, wherein each of the at least one channel resource unit is used to carry at least one payload associated with a reference signal the at least one payload; and
    perform a random access procedure based on the mapping, wherein determining the mapping comprises:
    mapping the at least one preamble to the at least one channel resource unit based on an increasing order of reference signal indexes of the reference signal and consecutive preamble indexes of the at least one preamble, wherein:
    the mapping ratio corresponds to an integer value greater than or equal to a ratio between a first parameter and a second parameter;
    the first parameter corresponds to a value representing a total number of the at least one preamble; and
    the second parameter corresponds to a value determined from combining a total number of the at least one channel resource unit and a total number of demodulation reference signal (DMRS) indexes.

13. The computer program apparatus of claim 12, wherein:
    information about the at least one channel resource unit is determined based on configured values in a radio resource control (RRC) message; and
    the configured values comprise at least one of a number of frequency domain multiplexed physical uplink shared channel (PUSCH) occasions (Nfdm), a number of time domain multiplexed PUSCH occasions (Ntdm), or offsets to associated random access channel occasion.

14. The computer program apparatus of claim 12, wherein information about the at least one channel resource unit comprise a number of DMRS ports.

15. The computer program apparatus of claim 12, wherein the total number of DMRS indexes is determined based on at least one of:
   at least one DMRS sequence;
   at least one orthogonal cover code (OCC); or
   at least one code division multiplexing (CDM) group.

* * * * *